United States Patent
Baumann et al.

(10) Patent No.: US 12,179,439 B2
(45) Date of Patent: Dec. 31, 2024

(54) APPARATUS AND METHOD FOR APPLYING AN ELONGATE FIBER TOW

(71) Applicant: 9T LABS AG, Zürich (CH)

(72) Inventors: Leo Baumann, Zürich (CH); Lucien Segessemann, Zürich (CH); Chester Houwink, Zürich (CH); Martin Eichenhofer, Zürich (CH); Giovanni Cavolina, Zürich (CH)

(73) Assignee: 9T LABS AG, Zürich (CH)

( * ) Notice: Subject to any disclaimer, the term of this patent is extended or adjusted under 35 U.S.C. 154(b) by 268 days.

(21) Appl. No.: 17/789,419

(22) PCT Filed: Jan. 4, 2021

(86) PCT No.: PCT/IB2021/050016
§ 371 (c)(1),
(2) Date: Jun. 27, 2022

(87) PCT Pub. No.: WO2021/137200
PCT Pub. Date: Jul. 8, 2021

(65) Prior Publication Data
US 2023/0050763 A1    Feb. 16, 2023

(30) Foreign Application Priority Data

Jan. 2, 2020  (WO) .................. PCT/IB2020/050013
Mar. 4, 2020  (WO) .................. PCT/IB2020/051893

(51) Int. Cl.
*B29C 70/34*    (2006.01)
*B29C 70/38*    (2006.01)
*B29C 70/54*    (2006.01)

(52) U.S. Cl.
CPC ............ *B29C 70/34* (2013.01); *B29C 70/545* (2013.01); *B29C 70/38* (2013.01); *B29C 70/386* (2013.01); *B29C 70/388* (2013.01)

(58) Field of Classification Search
CPC ..... B29C 70/384; B29C 70/388; B29C 70/34; B29C 70/38; B29C 70/382; B29C 70/386;
(Continued)

(56) References Cited

U.S. PATENT DOCUMENTS 5,447,586 A * 9/1995 Tam .................. B29C 66/91411
156/169
5,700,347 A * 12/1997 McCowin ............. B29C 70/545
156/499

(Continued)

FOREIGN PATENT DOCUMENTS

| DE | 102006032122 | 12/2007 |
|---|---|---|
| WO | 2015009938 | 1/2015 |
| WO | 2015189600 | 12/2015 |

OTHER PUBLICATIONS

International Search Report and Written Opinion for International Application No. PCT/IB2021/050016 mailed Apr. 23, 2021 (11 pages).

*Primary Examiner* — Carson Gross
(74) *Attorney, Agent, or Firm* — Dicke, Billig & Czaja, PLLC

(57) ABSTRACT

A pressure foot device and system comprising a pressure foot device for forming and applying an elongate fiber tow, wherein the pressure foot device comprises a foot surface comprising a straight foot segment, a groove comprising a flared end and defining a groove midplane, and a foot shaft housing characterized by a foot shaft's axis of rotation that is orthogonal to the straight foot segment and comprised in the groove midplane.

21 Claims, 11 Drawing Sheets

(58) Field of Classification Search
CPC ..... B29C 64/118; B29C 64/209; B33Y 10/00; B33Y 30/00
See application file for complete search history.

(56) References Cited

U.S. PATENT DOCUMENTS

| | | | |
|---|---|---|---|
| 7,115,180 B2 * | 10/2006 | Bruyere | B29C 70/382 156/173 |
| 2015/0056318 A1 | 2/2015 | Ho | |
| 2017/0028623 A1 | 2/2017 | Evans et al. | |
| 2017/0282461 A1 | 10/2017 | Susnjara et al. | |

* cited by examiner

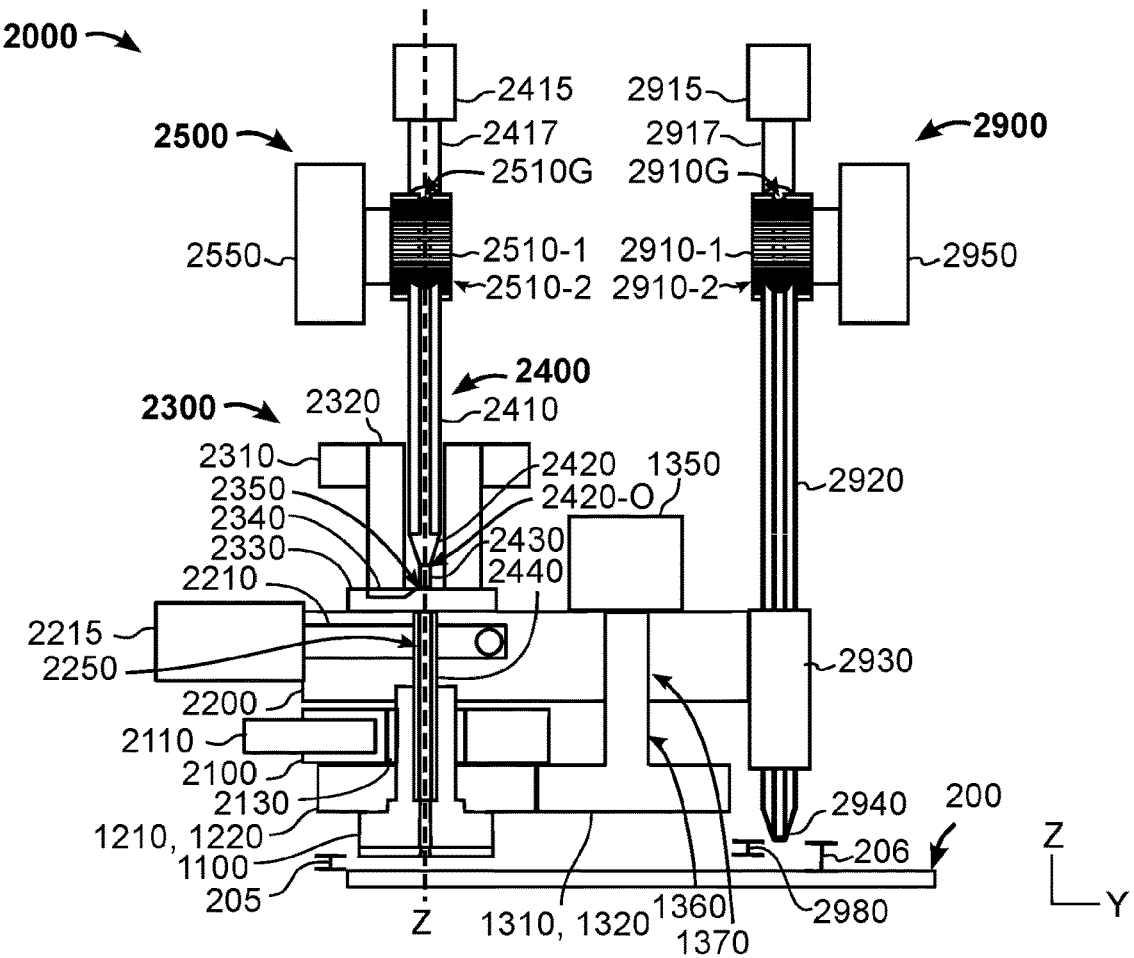
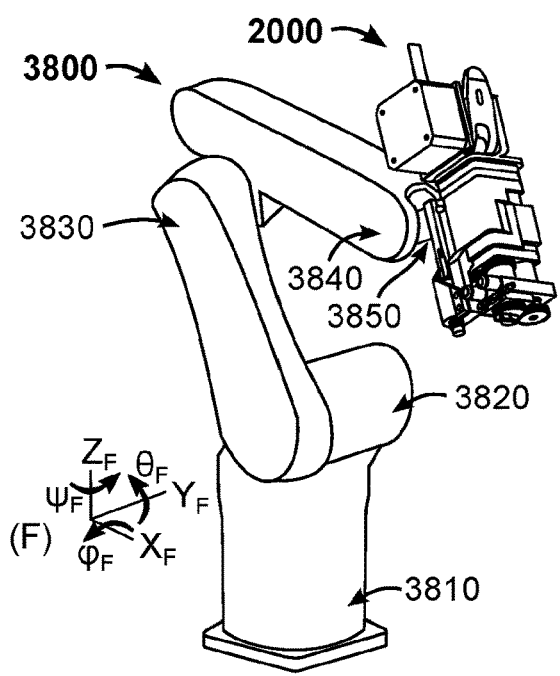
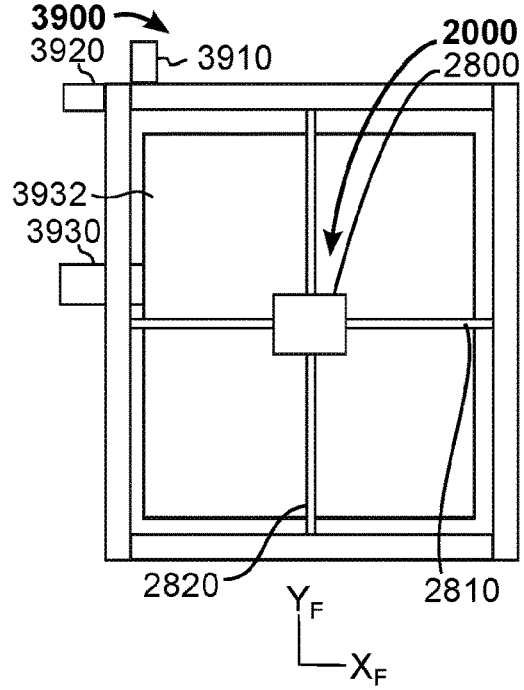

FIG. 11

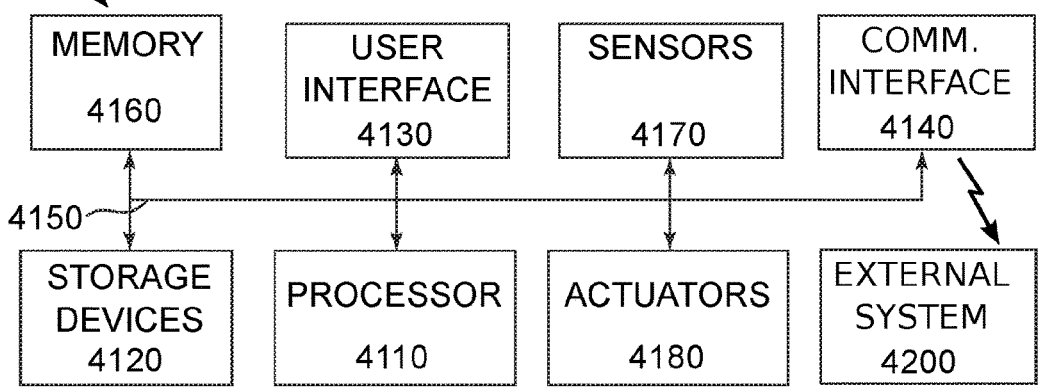

FIG. 12

| 5000 |
|---|
| 5100 TRANSLATE TOW |
| 5110 FORM FOLD IN TOW |
| 5120 ACQUIRE TOW TENSION MEASUREMENT |
| 5130 ADJUST TOW TRANSLATION SPEED |
| 5200 GUIDE TOW WITHIN GROOVE |
| 5210 HEAT TOW |
| 5220 ADJUST HEATING ELEMENT POWER |
| 5230 CURVE TOW AROUND FLARED END |
| 5240 PRESS TOW |
| 5250 COOL TOW |
| 5310 ROTATE PRESSURE FOOT |
| 5320 TRANSLATE PRESSURE FOOT |
| 5330 FORM CUT IN TOW AS FUNCTION OF PATH CURVATURE |
| 5340 ACTUATE TOW CUTTER |
| 5345 UNWIND TOW |
| 5350 MEASURE DISTANCE BETWEEN FOOT AND SURFACE |
| 5360 ADJUST DISTANCE BETWEEN FOOT AND SURFACE |
| 5370 ADJUST DISTANCE BETWEEN NOZZLE AND SURFACE |
| 5380 ADJUST DISTANCE OFFSET BETWEEN FOOT AND NOZZLE |
| 5390 GUIDE FOOT ALONG LANDING TRAJECTORY |

FIG. 13

6000
| 6100 TRANSLATE TOW |
| 6120 ACQUIRE TOW TENSION MEASUREMENT |
| 6130 ADJUST TOW TRANSLATION SPEED |
| 6135 ADJUST TOW RELATIVE TRANSLATION SPEED |
| 6220 ADJUST IR RADIATION POWER |
| 6250 ADJUST TOW COOLING |
| 6310 ROTATE PRESSURE FOOT |
| 6315 ROTATE PRESSURE FOOT AS FUNCTION OF TOW SPEED |
| 6320 TRANSLATE AND ROTATE PRESSURE FOOT |
| 6330 COMMAND CUT IN TOW AS FUNCTION OF PATH CURVATURE |
| 6340 ACTUATE TOW CUTTER |
| 6345 ADJUST TOW SPEED AS TOW CUTTER ACTUATED |
| 6350 ACQUIRE RANGEFINDER DATA |
| 6355 ADJUST TOW SPEED USING RANGEFINDER DATA |
| 6360 ADJUST DISTANCE BETWEEN FOOT AND SURFACE |
| 6370 ADJUST DISTANCE BETWEEN NOZZLE AND SURFACE |
| 6380 ADJUST DISTANCE OFFSET BETWEEN FOOT AND NOZZLE |
| 6390 GUIDE FOOT ALONG LANDING TRAJECTORY |
| 6400 STORE TOOLPATH INSTRUCTIONS |
| 6405 INSERT CUTTER INSTRUCTIONS |
| 6406 INSERT UNWIND INSTRUCTIONS |
| 6420 COMMAND DISPENSER NOZZLE SPATIAL POSITION |
| 6430 COMMAND DISPENSER NOZZLE EXTENSION ACTUATOR |

APPARATUS AND METHOD FOR APPLYING AN ELONGATE FIBER TOW

CROSS-REFERENCE TO RELATED APPLICATIONS

This Utility Patent Application claims priority under 35 U.S.C. § 371 to International Application No. PCT/IB2021/050016 filed Jan. 4, 2021, which claims the benefit of International Application No. PCT/IB2020/050013, filed Jan. 2, 2020 and International Application No. PCT/IB2020/051893, filed Mar. 4, 2020, all of which are incorporated herein by reference.

FIELD

The present invention relates to systems and methods for forming an elongate fiber tow, conveying an elongate fiber tow onto a surface, and forming fiber-reinforced plastic composite objects comprising one or more fiber tows.

BACKGROUND

Fiber-reinforced plastics (FRP), also called fiber-reinforced polymers, for example carbon fiber-reinforced plastics (CFRP) are widely used materials for lightweight structures, ranging from sports equipment, to automotive components, to aircraft structures. A method for manufacturing of FRP's comprises depositing fiber tows, for example preimpregnated tows, for example tapes, onto a substrate. The depositing is, for example, done by a robot, for example a manipulator comprising a tape dispensing end effector for additive manufacturing. Depositing tapes imposes constraints on one or more of: the speed at which the tape is deposited, the trajectories described by the depositing end effector, the radius of curvature of the trajectories, the amount of adhesive polymer used, the amount of air trapped in the FRP, the fiber volume fraction inside the FRP, the deposition process temperature, the polymer's viscosity, the deposited layer's geometry, for example defined by its dimensions (for example defined by one or more of its length, width, and height), and the interleaving, juxtaposition, and superposition patterns of tapes, for example tape layers. There is therefore a need for fiber tows, for example preimpregnated tows, that enable their deposition at greater speed and greater homogeneity than can be achieved using conventional tape-laying techniques. There is a need for systems and methods to manufacture fiber tows. There is also a need for systems and methods to deliver and apply fiber tows onto a surface to form an object. There is also a need to lay fiber tows over trajectories that comprise curves with small radii of curvature, and with improved and diversified fiber layout patterning capabilities.

SUMMARY

A problem in the field fiber-reinforced plastics relates to the speed at which one or more fiber rovings can be deposited to form a layout. Another problem relates to the precision of the layout. A further problem relates to the density of fibers within a given volume that can be achieved to confer strength to the resulting composite material. It is therefore an object of this disclosure to provide embodiments for systems and methods to manufacture fiber tows. It also an object of this disclosure to provide systems and methods to deliver and apply fiber tows onto a surface to form an object. It is also an object of this disclosure to provide methods to lay fiber tows over trajectories that comprise curves with small radii of curvature.

One embodiment of the present disclosure comprises a pressure foot device for applying an elongate fiber tow onto an object surface, the device comprising: a foot surface, for pressing the fiber tow onto the object surface, the foot surface comprising a straight foot segment for pressing the fiber tow onto the object surface, the straight foot segment comprising a rear end and a front end that define a frontal direction Fx from the rear end to the front end; and a groove comprising a left lip and a right lip, for guiding the tow to the foot surface, the groove defining a groove midplane as a planar portion along the groove's mid-line and extending until between the left lip and the right lip of the groove, the groove joining onto the front end of the straight foot segment and oriented at an elevation angle with respect to the straight foot segment, wherein the groove comprises a flared end that joins with the foot surface.

For example, the elevation angle of a portion of the groove is 90°. For example, the groove comprises a flared entry at a groove entry located at the end that is opposite that of the flared end. For example, the foot surface comprises: a first toe surface at a first side of the groove's midplane and oriented at a first elevation angle and a first azimuthal angle offset from the frontal direction Fx; and a second toe surface at a second side of the groove's midplane and oriented at a second elevation angle and a second azimuthal angle offset from the frontal direction Fx, wherein the first azimuthal angle and the second azimuthal angle are comprised in a range from 30° to 90° with respect to the frontal direction Fx. For example, the first azimuthal angle and the second azimuthal angle are at about 90° with respect to the frontal direction Fx.

For example, the first toe surface and the second toe surface are coplanar. For example, the flared end comprises a chamfer with an elevation angle in a range from 30° to 70° with respect to the frontal direction Fx. For example, the flared end comprises a fillet joining the groove to the straight foot segment. For example, the foot surface is planar. For example, the foot surface, viewed cross-sectionally in a Y-Z plane orthogonal to the straight foot segment, comprises one or more raised contour portions, facing the object surface that are raised in the Z-direction away from the object surface with respect to the straight foot segment. For example, one or more of the one or more raised contour portions, forms a raising curve. For example, one or more of the one or more raised contour portions forms a raising straight line. For example, the foot surface comprises an azimuthal sector of a truncated hollow body of revolution the axis of which is comprised in the groove's midplane wherein the azimuthal sector is comprised in a range from 180° to 320°. For example, the device comprises a hollow foot shaft, the axis of which is comprised on the groove's midplane. For example, the device comprises a foot pinion, the axis of which is comprised on the groove's midplane. For example, the device comprises a foot pulley, the axis of which is comprised on the groove's midplane.

For example, the foot surface comprises, with respect to the front end, a first material within a first sector that is proximal to the front end and a second material within a second sector that is distal from the front end, wherein the thermal conductivity of the second material is at most half that of the first material. For example, the foot surface comprises a heat sink. For example, the foot surface comprises a heat sink that forms a surrounding second sector around a first sector that is proximal to the groove. For example, the flared end comprises a first flared end portion that is proximal to the groove, is raised from the foot surface by a distance, and separated by a second sector from a heat sink portion comprised in the foot surface, and wherein the second sector forms a thermally insulating portion between the first flared end portion and the foot surface.

For example, the groove's cross-section comprises one or more pairs of symmetrically opposing circular contour sectors with respect to the midplane, comprised at a groove depth greater or equal than that of the radius of the greatest circular contour sectors. For example, the groove's cross-section comprises one or more U-shaped groove cross-sections that scale down into the groove. For example, the groove comprises a cross-section that comprises 2 or more straight sides joined by a fillet. For example, a distance between a groove's first lip and a groove's second lip is comprised in a range from 0.2 mm to 2 mm, for example in a range from 0.2 to 1 mm.

One embodiment of the present disclosure comprises a system for applying an elongate fiber tow onto an object surface, the system comprising a pressure foot device. For example, the pressure foot device comprises a foot surface, for pressing the fiber tow onto the object surface, the foot surface comprising a straight foot segment for pressing the fiber tow onto the object surface, the straight foot segment comprising a rear end and a front end that define a frontal direction Fx from rear end to front end; and a groove comprising a left lip and a right lip, for guiding the tow to the foot surface, the groove defining a groove midplane as a planar portion along the groove's mid-line between the left lip and the right lip of the groove, the groove joining onto the front end of the straight foot segment and being oriented at an elevation angle with respect to the straight foot segment, wherein the groove comprises a flared end that joins with the foot surface; and a foot shaft housing, characterized by a foot shaft's axis of rotation Z, defining a Z-axis, wherein the foot shaft's axis of rotation Z is orthogonal to the straight foot segment and comprised in the groove midplane.

For example, the pressure foot device comprises a hollow foot shaft, the axis of which is collinear with the foot shaft's axis of rotation Z and wherein a portion of the shaft forms a sliding fit within the foot shaft housing. For example, the foot shaft housing comprises one or more sources of heat. For example, the system comprises a source of radiation comprising infrared radiation directed towards the groove. For example, the foot shaft housing comprises one or more induction heating coils. For example, the axis of one or more of the induction heating coils is parallel to that of the foot shaft's axis of rotation Z. For example, the system comprises a temperature sensor comprised in one or more of: the foot shaft housing; and the pressure foot device.

For example, the foot shaft housing comprises a cylindrical sleeve that is coaxial with the foot shaft's axis of rotation Z. For example, the system comprises one or more pinch roller assemblies. For example, one or more of the pinch roller assemblies comprises a first roller and a second roller, wherein a tangent that is common to the first roller and to the second roller is collinear with the foot shaft's axis of rotation Z. For example, one or more of the pinch roller assemblies comprises a first roller and a second roller, wherein one or more of the rollers comprises a rectangular groove in the roller's perimeter. For example, one or more of the pinch roller assemblies comprises a first roller and a second roller, wherein one or more of the rollers comprises a rectangular groove in the roller's perimeter and wherein the groove's cross section intersects the foot shaft's axis of rotation Z.

For example, the system comprises a tow cutter assembly comprising an orifice and a blade, the orifice intersecting the foot shaft's axis of rotation Z. For example, the system comprises a tow cutter assembly comprising a blade guided by a rail that is mechanically coupled to a rotatable ring, the rotation axis of which is collinear with the foot shaft's axis of rotation Z.

For example, the system comprises a heat exchanger housing disposed between the foot shaft housing and one or more of the one or more pinch roller assemblies, the heat exchanger housing comprising a first through hole, the axis of which is collinear with the foot shaft's axis of rotation Z. For example, the heat exchanger housing is disposed between a tow cutter assembly and the foot shaft housing. For example, the heat exchanger housing comprises one or more ducts. For example, the heat exchanger housing comprises a duct that forms a turning path of at least 180° around the foot shaft's axis of rotation Z. For example, the heat exchanger housing comprises a second through hole, the axis of which is parallel to the foot shaft's axis of rotation Z. For example, the heat exchanger housing comprises a drive shaft that forms a coupling with the pressure foot device. For example, the heat exchanger housing forms a thermally conductive contact with a drive shaft that forms a coupling with the pressure foot device, wherein the contact's interfacial conductance is greater than 500 W/m$^2$/K. For example, the heat exchanger housing comprises a tow duct, wherein the tow duct comprises an entry portion and an exit portion, and wherein the exit portion's axis of symmetry is comprised in the groove midplane.

For example, a portion of the tow duct comprises a convergent tow duct nozzle, the outlet of the convergent tow duct nozzle being oriented towards the groove, and wherein the axis of symmetry of the outlet is comprised in the groove midplane.

For example, the system comprises one or more rangefinding detector assemblies each comprising a rangefinder, one or more of the rangefinder's measurement axes ZR being oriented along a direction parallel that of the foot shaft's axis of rotation Z, wherein the distance from the rangefinding detector's measurement axis ZR to the foot shaft's axis of rotation Z is greater than the distance from the foot shaft's axis of rotation Z to the straight foot segment's rear end and less than 20 cm. For example, one or more of the one or more rangefinding detector assemblies comprises a translation stage.

For example, the system comprises a tow forming assembly, the tow forming assembly comprising one or more grooved wheels wherein at least a portion of the groove's cross-section is rectangular. For example, the cross-section of the groove of one or more grooved wheels comprises a V-shaped groove entry and a rectangular-shaped groove depth.

For example, the system comprises one or more sources of infrared radiation directed towards the tow. For example, the system comprises a tow longitudinal tension detector.

For example, the system comprises a slide head comprising one or more axes. For example, one or more of the one or more axes is intersected by the Z-wise extended groove midplane that extends the groove midplane in the Z-direction. For example, one or more of the one or more axes comprises two orthogonal axes, the intersection point of which is about on the Z-wise extended groove midplane that extends the groove midplane in the Z-direction.

For example, the system comprises a support chassis comprising a tubular clamp, the axis of which is parallel to the foot shaft's axis of rotation Z.

For example, the system comprises one or more of a pinch roller motor coupled to one or more pinch roller assemblies, a tow cutter motor coupled to a tow cutter assembly, and a foot rotation motor coupled to the pressure foot device.

For example, the system comprises a dispenser nozzle outlet for dispensing a thermoplastic material onto the object surface. For example, the system comprises a dispenser nozzle extension actuator to adjust the Z-axis position of the dispenser nozzle's outlet. For example, the Z-axis position of the dispenser nozzle's outlet is offset from the Z-axis position of the straight foot segment by an offset comprised in a range from −4 mm to +4 mm.

For example, the system comprises a robotic support to configure one or more of the position and speed of the pressure foot device at one or more spatial positions ($X_F$, $Y_F$, $Z_F$) and one or more spatial orientations ($\varphi_F$, $\theta_F$, $\psi_F$).

For example, the system comprises a computer system. For example, the computer system comprises one or more of a digital processor, a computer-readable non-volatile storage device, a user interface device, a data bus connected to one or more sensors and actuators comprised in the system, and a communication interface device for transferring data between one or more of the digital processor, the computer-readable non-volatile storage device, the data bus, the user interface device, and one or more external systems external to the system comprising one or more of a processor, a storage device, a user interface, an actuator, and a sensor.

Another embodiment of the present disclosure comprises a method for applying an elongate fiber tow onto an object surface, the method comprising: translating an elongate fiber tow into a groove of a pressure foot device unto a foot surface of the pressure foot device, the groove comprising a left lip, a right lip, and defining a groove midplane along the groove's mid-line and extending until between the left lip and the right lip of the groove; guiding the fiber tow within the groove to a flared end of the groove; curving the fiber tow around the flared end of the groove to a straight foot segment comprised in the foot surface of the pressure foot device, wherein the straight foot segment comprises a rear end and a front end that define a frontal direction Fx from the rear end to the front end, and the groove joining onto the front end of the straight foot segment and being oriented at an elevation angle with respect to the straight foot segment; and pressing the fiber tow between the straight foot segment and the object surface.

For example, one or more of translating, guiding, curving, and pressing comprises heating the fiber tow. For example, pressing comprises cooling the fiber tow. For example, pressing comprises a first step that comprises heating the fiber tow and a second step that comprises cooling the fiber tow. For example, the method comprises adjusting electrical power delivered to one or more sources of heat for heating the fiber tow. For example, the method comprises rotating the pressure foot device around an axis of rotation Z that is orthogonal to the straight foot segment and comprised within the groove midplane. For example, the method comprises translating the pressure foot device. For example, the method comprises one or more of translating and rotating the pressure foot device along a path from a path start to a path end, wherein the straight foot segment is collinear with a tangent to the path of the pressure foot device and the point of tangency to the path is comprised within the groove midplane. For example, the fiber tow is translated within the groove at a speed equal to the speed at which the point of tangency to the path translates along the path. For example, the method comprises forming a cut in the fiber tow at the location where the radius of curvature of the path is one or more of less than 2 mm, less than 3 mm, and less than 5 mm.

For example, the method comprises actuating a tow cutter assembly at a location along the path that is ahead of the path end by a path length equal to the length of fiber tow from the tow cutter assembly's blade to the front end of the straight foot segment. For example, the method comprises unwinding the tow wherein unwinding comprises rotating the pressure foot device. For example, the method comprises forming a measurement of a distance between the straight foot segment and the object surface. For example, the method comprises adjusting a distance between the straight foot segment and the object surface. For example, the method comprises adjusting a distance between a dispenser nozzle and the object surface. For example, the method comprises adjusting a distance offset of the dispenser nozzle with respect to the object surface as a function of a distance between the straight foot segment and the object surface.

For example, the method comprises: translating the fiber tow within the groove by a length comprised in a range from 2 mm to 30 mm; and guiding the pressure foot device along a landing trajectory onto the object surface.

For example, the method comprises forming one or more folds along the length of the fiber tow by passing a fiber tape within one or more grooves comprising a rectangular cross-section. For example, the forming one or more folds comprises passing the fiber tape within one or more grooves that are comprised on one or more grooved wheels. For example, the method comprises acquiring measurements of the longitudinal tension of the fiber tow from a tow longitudinal tension detector. For example, the method comprises adjusting the speed of the translating of the tow as a function of measurements of the longitudinal tension of the fiber tow from a tow longitudinal tension detector.

Yet another embodiment of the present disclosure comprises a computer-readable non-volatile storage device comprising executable instructions that, when executed by one or more processors of a system for applying an elongate fiber tow onto an object surface, cause the system to at least: a) command one or more of position and speed of a first motor, causing an elongate fiber tow to translate along a groove of a pressure foot device; and b) command one or more of position and speed of a second motor coupled to a pressure foot device and causing the pressure foot device to rotate, wherein the pressure foot device comprises a foot surface for pressing the fiber tow onto the object surface, the foot surface comprising a straight foot segment for pressing the fiber tow onto the object surface, wherein the straight foot segment comprises a rear end and a front end that define a frontal direction Fx from rear end to front end, and wherein the pressure foot device rotates around an axis of rotation Z that is orthogonal to the straight foot segment and comprised within a groove midplane along a groove's mid-line comprised between a left lip and a right lip of the groove.

For example, the instructions comprise instructions wherein the speed at which the first motor is commanded is a function of the speed at which the second motor is commanded. For example, the instructions comprise instructions to command a third motor coupled to a tow cutter assembly and causing the tow cutter assembly to displace a blade from a first position to a second position.

For example, the instructions comprise instructions to adjust the speed of the first motor as a function of a command sent to the third motor. For example, the instructions comprise instructions to acquire rangefinder measurement data from one or more rangefinding detector assemblies. For example, the instructions comprise instructions to adjust the speed of the first motor as a function of measurements acquired from the one or more rangefinding detector assemblies. For example, the instructions comprise instructions to acquire measurement data from one or more tow longitudinal tension detectors.

For example, the instructions comprise instructions to adjust the speed of the first motor as a function of measurements acquired from one or more of the one or more tow longitudinal tension detectors. For example, the instructions comprise instructions to adjust the relative speed of one or more first motors as a function of measurements acquired from one or more of one or more tow longitudinal tension detectors. For example, the instructions comprise instructions to store one or more numerical toolpath instructions comprising one or more of position and orientation of the pressure foot device.

For example, the instructions comprise instructions to insert one or more commands for a third motor coupled to a tow cutter assembly into the numerical toolpath instructions as a function of one or more of a path length and one or more path curvatures. For example, the instructions comprise instructions to insert one or more instructions to command unwinding of the tow, the instructions comprising commands to actuate the second motor. For example, the instructions comprise instructions to command one or more motors to configure one or more of the position and speed of the pressure foot device at one or more spatial positional coordinates $X_F$, $Y_F$, $Z_F$ and one or more spatial orientation coordinates.

For example, the instructions comprise instructions to adjust the distance between the straight foot segment and the object surface by commanding one or more motors to configure one or more of the position ($X_F$, $Y_F$, $Z_F$; $\varphi_F$, $\theta_F$, $\psi_F$) and speed of the pressure foot device as a function of measurements acquired from one or more rangefinding detector assemblies. For example, the instructions comprise instructions to adjust the distance between the straight foot segment along the axis of rotation Z and the object surface to a value comprised in a range from 0.05 mm to 1.0 mm.

For example, the instructions comprise instructions for translating and rotating the pressure foot device along a path from a path start to a path end, wherein the second motor is commanded so that the straight foot segment remains collinear with the local tangent to the path of the pressure foot device and the point of tangency remains comprised within a segment extending from the straight foot segment's front end into the length of the groove's mid-line.

For example, the instructions comprise instructions to command one or more motors to configure one or more of the position and speed of a dispenser nozzle at one or more spatial positional coordinates ($X_F$, $Y_F$, $Z_F$) and one or more spatial orientation coordinates ($\varphi_F$, $\theta_F$, $\psi_F$). For example, the instructions comprise instructions to command a dispenser nozzle extension actuator to adjust one or more of the extension position and speed of the dispenser nozzle as a function of one or more of the position and speed of the pressure foot device.

BRIEF DESCRIPTION OF DRAWINGS

FIG. 8 is a frontal cross-section of a system for applying an elongate fiber tow further comprising a dispenser nozzle outlet for dispensing a thermoplastic material.

FIG. 9 is a perspective view of a system for applying an elongate fiber tow mounted on a robotic manipulator.

FIG. 10 is a top view of a system for applying an elongate fiber tow comprised in an X-Y gantry that further comprises a Z-wise actuated object support.

FIG. 11 is a block diagram of a computer system for controlling the system for applying an elongate fiber tow.

FIG. 12 is a block diagram of a method for applying an elongate fiber tow onto an object surface.

FIG. 13 is a block diagram of computer-readable instructions for controlling the system for applying an elongate fiber tow.

DESCRIPTION OF EMBODIMENTS

Figure 1A:
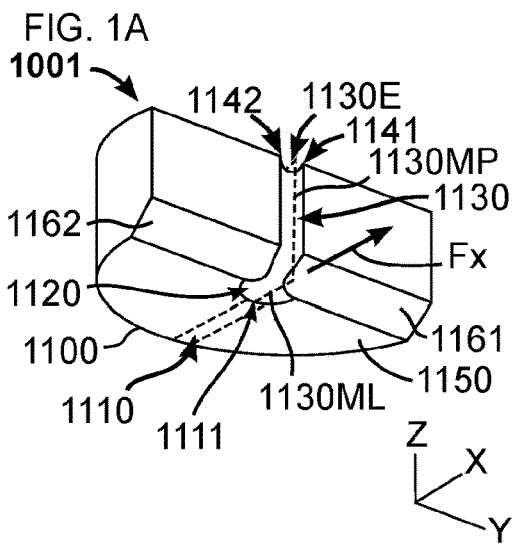
FIG. 1A is a perspective view of a pressure foot device comprising a groove with a flared end.
Figure 1B:
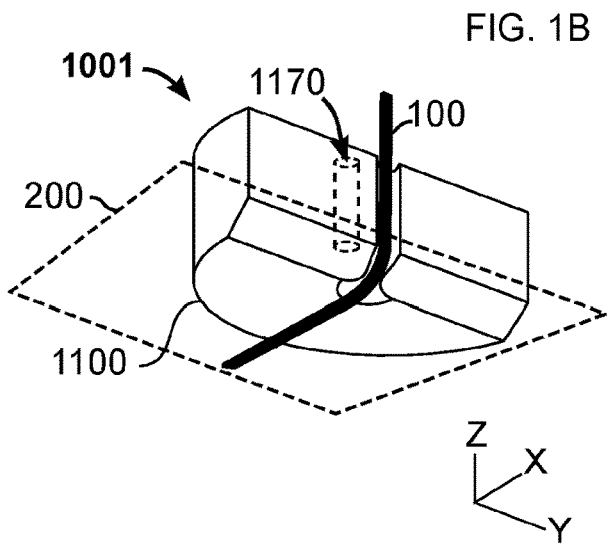
FIG. 1B is a perspective view of a pressure foot device with a tow and a temperature sensor.
Figure 1C:
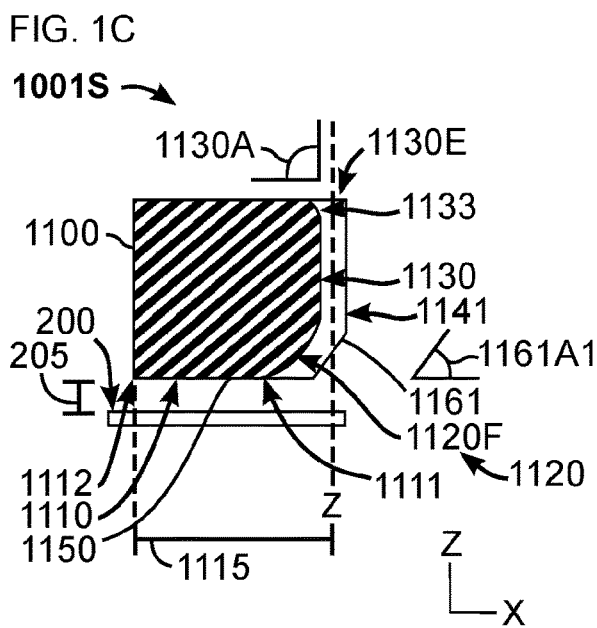
FIG. 1C is a cross-sectional side view of a pressure foot device comprising a flared entry and a flared end.
Figure 1D:
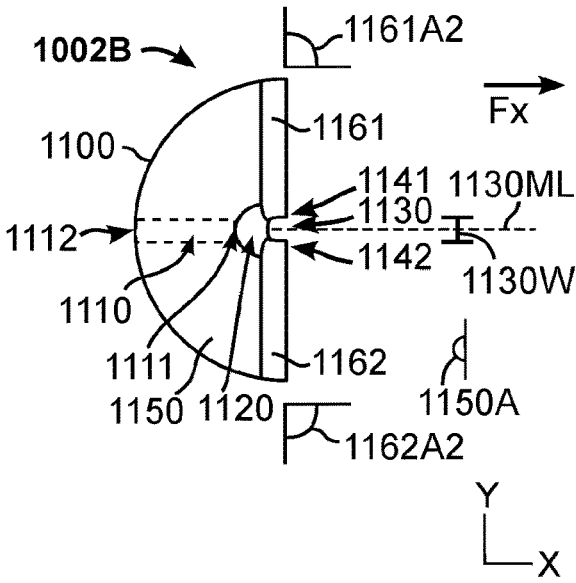
FIG. 1D is a bottom view of a pressure foot device comprising i) a first and a second toe surfaces set at 90° azimuthal offset with respect to the frontal direction of the pressure foot device, and ii) a groove comprising a rounded rectangular cross-section.
Figure 1E:
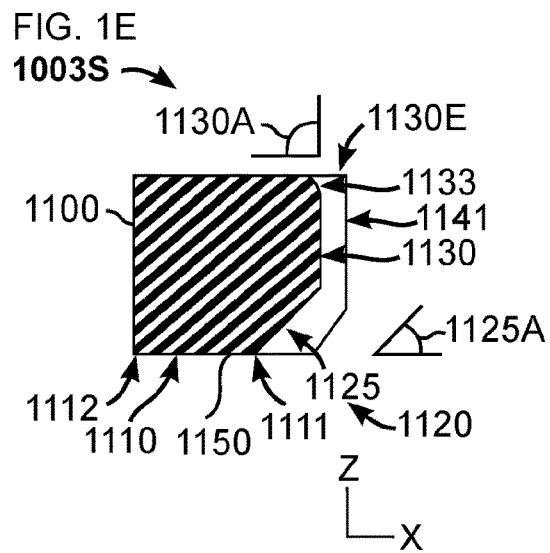
FIG. 1E is a cross-sectional side view of a pressure foot device comprising a flared end that comprises a chamfer.
Figure 1F:
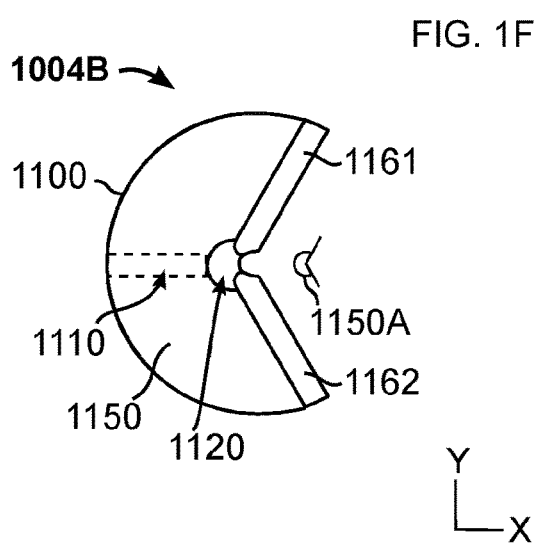
FIG. 1F is a bottom view of a pressure foot device comprising a first and a second toe surfaces set at an azimuthal offset comprised in a range from 30° to 90° with respect to the frontal direction of the pressure foot device.
Figure 1G:
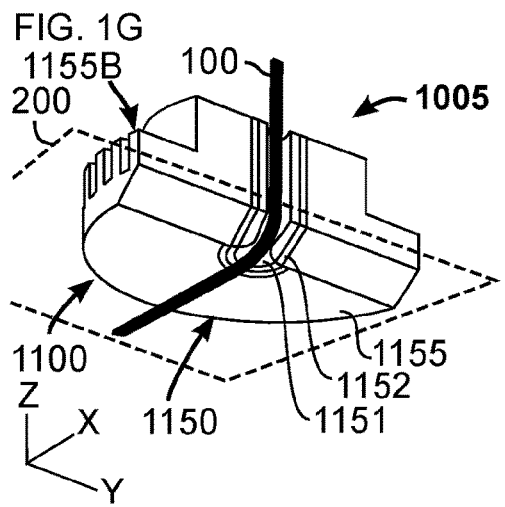
FIG. 1G is a perspective view of a pressure foot device comprising a third portion insulated thermally by a second portion from a first portion that is proximal to the groove.
Figure 1H:
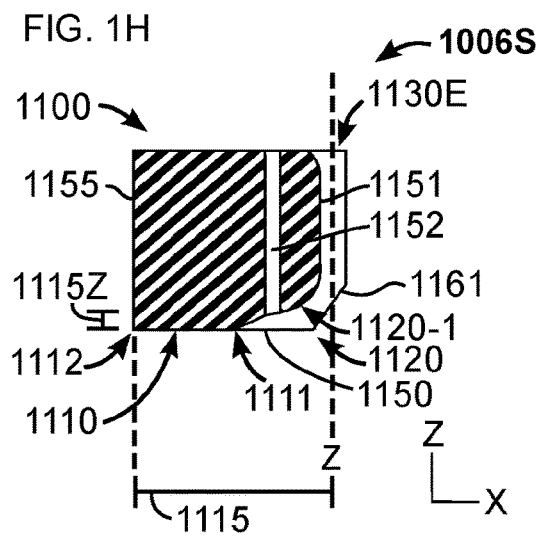
FIG. 1H is a cross-sectional side view of a pressure foot device wherein the flared end comprises a third portion that is insulated thermally by a second portion from a first portion that is proximal to the groove.
Figure 1I:
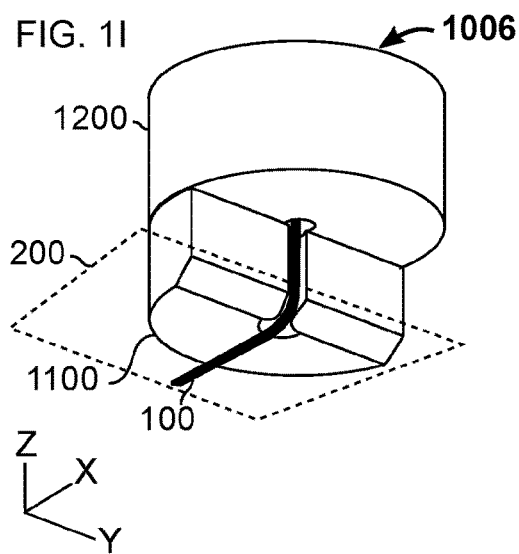
FIG. 1I is a perspective view of a pressure foot device comprising a hollow foot shaft.
Figure 1J:
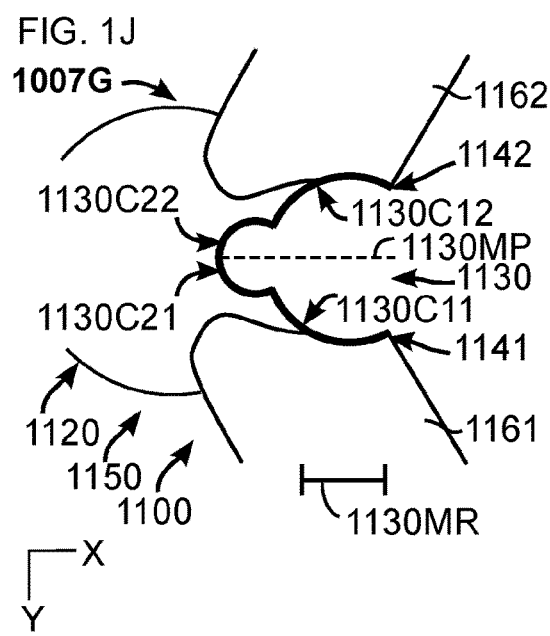
FIG. 1J is a bottom view of a pressure foot device comprising a groove the cross-section of which comprises one or more pairs of symmetrically opposing circular contour sectors.
Figure 1K:
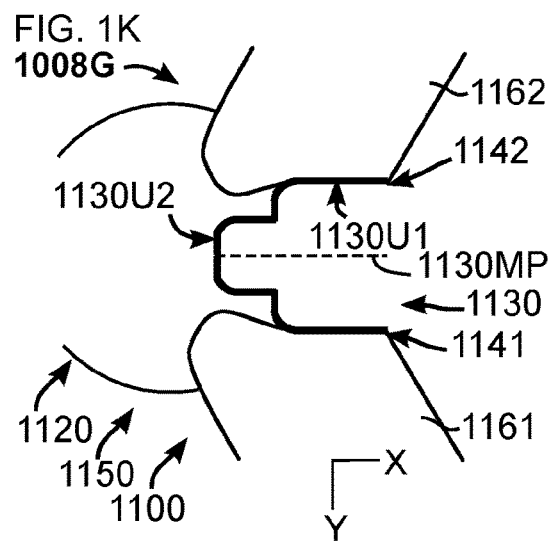
FIG. 1K is a bottom view of a pressure foot device comprising a groove the cross-section of which comprises one or more U-shaped groove cross-sections that scale down into the groove.
Figure 1L:
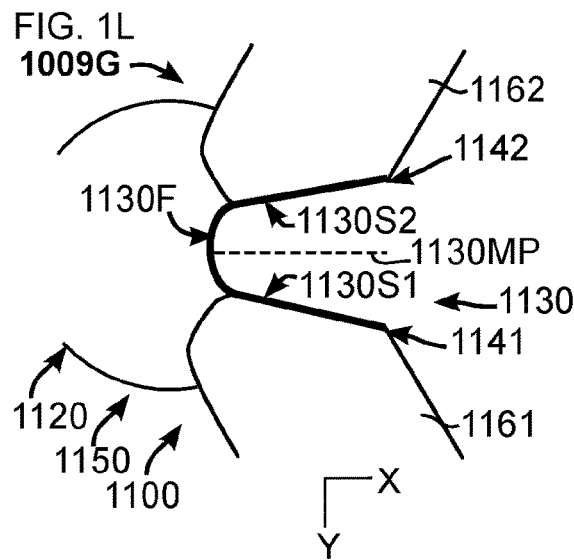
FIG. 1L is a bottom view of a pressure foot device comprising a groove the cross-section of which comprises 2 or more straight sides joined by a fillet.
Figure 1M:
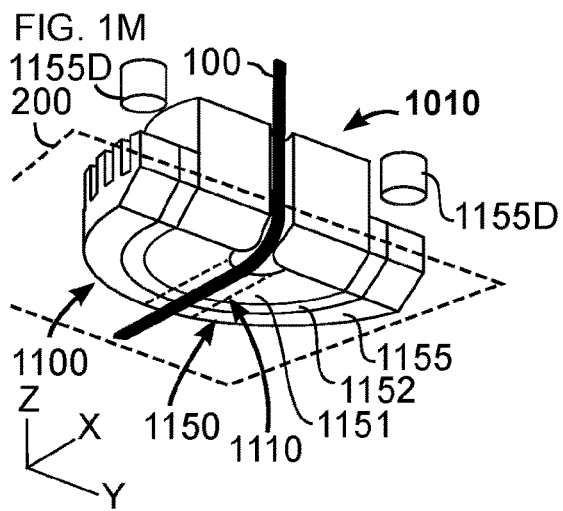
FIG. 1M is a perspective view of a pressure foot device comprising a heat sink.
Figure 1N:
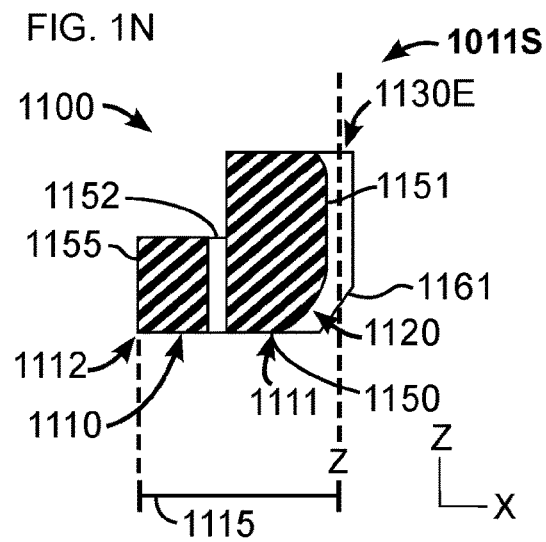
FIG. 1N is a cross-sectional side view of a pressure foot device comprising a heat sink.
Figure 1O:
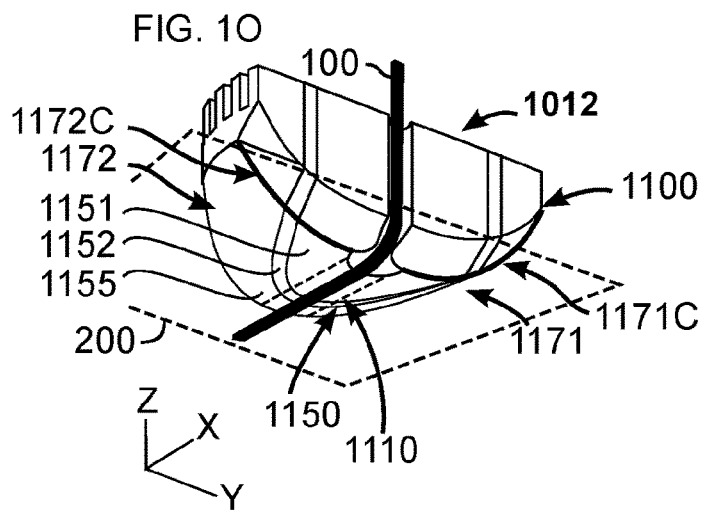
FIG. 1O is a perspective view of a pressure foot device comprising one or more curved raised contour portions.
Figure 1P:
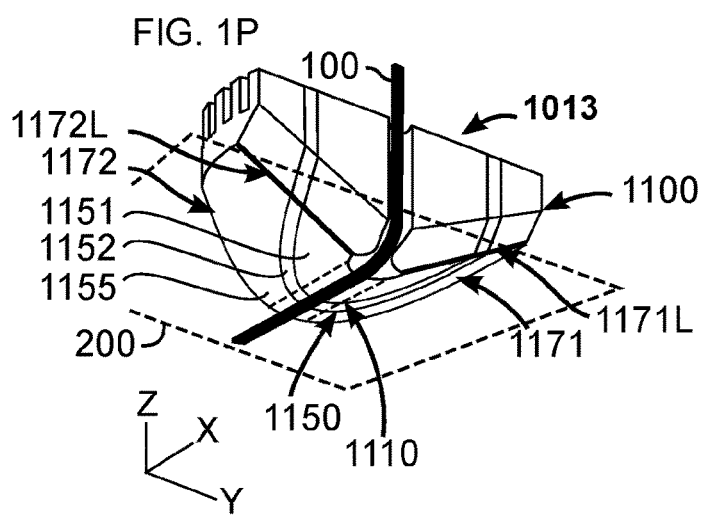
FIG. 1P is a perspective view of a pressure foot device comprising one or more straight raised contour portions.

FIGS. 1A to 1P present example embodiments 1001, 1001S, 1002B, 1003S, 1004B, 1005, 1006S, 1006, 1007G, 1008G, 1009G, 1010, 1011S, 1012, 1013 of a pressure foot device 1100 for applying an elongate fiber tow 100. For example, a pressure foot device 1100 for applying an elongate fiber tow 100 onto an object surface 200, the device comprising: a foot surface 1150, for pressing the fiber tow 100 onto the object surface 200, the foot surface 1150 comprising a straight foot segment 1110 for pressing the fiber tow 100 onto the object surface 200, the straight foot segment 1110 comprising a rear end 1112 and a front end 1111 that define a frontal direction Fx from the rear end to the front end; and a groove 1130 comprising a left lip 1141 and a right lip 1142, for guiding the tow to the foot surface 1150, the groove 1130 defining a groove midplane 1130MP as a planar portion along the groove's mid-line 1130ML and extending until between the left lip 1141 and the right lip 1142 of the groove 1130, the groove 1130 joining onto the front end 1111 of the straight foot segment 1110 and oriented at an elevation angle 1130A with respect to the straight foot segment 1110, wherein the groove 1130 comprises a flared end 1120 that joins with the foot surface 1150. For example, the elevation angle 1130A of a portion of the groove 1130 is 90°. For example, the groove 1130 comprises a flared entry 1133 at a groove entry 1130E located at the end that is opposite that of the flared end 1120. In some embodiments, the groove 1130 comprises one or more enclosed portions forming, for example, a channel.

For example, the foot surface 1150 comprises: a first toe surface 1161 at a first side of the groove's midplane 1130MP and oriented at a first elevation angle 1161A1 and a first azimuthal angle 1161A2 offset from the frontal direction Fx; and a second toe surface 1162 at a second side of the groove's midplane 1130MP and oriented at a second elevation angle 1162A1 and a second azimuthal angle 1162A2 offset from the frontal direction Fx, wherein the first azimuthal angle 1161A2 and the second azimuthal angle 1162A2 are comprised in a range from 30° to 90° with respect to the frontal direction Fx. For example, the first azimuthal angle 1161A2 and the second azimuthal angle 1162A2 are at about 90° with respect to the frontal direction Fx. For example, the first toe surface 1161 and the second toe surface 1162 are coplanar. For example, the flared end 1120 comprises a chamfer 1125 with an elevation angle 1125A in a range from 30° to 70° with respect to the frontal direction Fx. For example, the flared end 1120 comprises a fillet 1120F joining the groove 1130 to the straight foot segment 1110. For example, the foot surface 1150 is planar. For example, the foot surface 1150, viewed cross-sectionally in a Y-Z plane orthogonal to the straight foot segment 1110, comprises one or more raised contour portions 1171, 1172 facing the object surface 200 that are raised in the Z-direction away from the object surface 200 with respect to the straight foot segment 1110.

FIG. 1O is a perspective view of a pressure foot device 1100 comprising one or more curved raised contour portions 1171, 1172. For example, one or more of the one or more raised contour portions 1171, 1172 forms a raising curve 1171C, 1172C. FIG. 1P is a perspective view of a pressure foot device 1100 comprising one or more straight raised contour portions 1171, 1172. For example, one or more of the one or more raised contour portions 1171, 1172 forms a raising straight line 1171L, 1172L.

For example, the foot surface 1150 comprises an azimuthal sector 1150A of a truncated hollow body of revolution the axis of which is comprised in the groove's midplane 1130MP wherein the azimuthal sector 1150A is comprised in a range from 180° to 320°. For example, the device 1100 comprises a hollow foot shaft 1200, the axis of which is comprised on the groove's midplane 1330MP.

For example, the device comprises a foot pinion 1210, the axis of which is comprised on the groove's midplane 1330MP. For example, the foot pinion 1210 comprises an orifice 1211 on its axis of rotation, for example for passage of a fiber tow 100. For example, the foot pinion 1210 comprises one or more fixation points 1212, for example a rail, for adjusting the position of the pressure foot device 1100, for example for adjusting the position of the groove 1130, with respect to the foot pinion's orifice 1211. For example, another embodiment for a pressure foot device 1100 is an integral part, for example formed of a single milled or molded component, comprising the features of the pressure foot device 1100 and the pressure foot pinion 1210, for example formed as a pressure foot device comprising a plurality of pinion teeth forming a pinion, the axis of which is comprised in the groove's midplane 1130MP.

For example, the device comprises a foot pulley 1220, the axis of which is comprised on the groove's midplane 1330MP. For example, the foot pulley 1220 comprises an orifice 1221 on its axis of rotation, for example for passage of a fiber tow 100. For example, the foot pulley 1220 comprises one or more fixation points 1222, for example a rail, for adjusting the position of the pressure foot device 1100, for example for adjusting the position of the groove 1130, with respect to the foot pulley's orifice 1221. For example, another embodiment for a pressure foot device 1100 is an integral part, for example formed of a single milled or molded component, comprising the features of the pressure foot device 1100 and the pressure foot pulley 1220, the axis of which is comprised in the groove's midplane 1130MP.

For example, the foot surface 1150 comprises, with respect to the front end, a first material within a first sector 1151 that is proximal to the front end and a second material within a second sector 1152 that is distal from the front end, wherein the thermal conductivity of the second material is at most half that of the first material. One or more of the first material and the second material comprise, for example: a steel alloy, for example a hardened steel, for example a DIN 1.3505 steel, for example a DIN 1.3343 steel; an alloy, for example a metal alloy, comprising one or more of: copper, aluminium, iron, nickel, tin, titanium, tungsten, vanadium, and zinc; a ceramic, a glass, and a polymer. In some embodiments, the foot surface comprises a coating, for example a coating comprising one or more of: a metal; a hardened metal; a metal oxide; a ceramic; a polymer, for example a polytetrafluoroethylene. For example, the foot surface has a Rockwell scale hardness of HRC 55 or greater.

FIG. 1M is a perspective view and FIG. 1N is a cross-sectional side view of a pressure foot device 1100 comprising a heat sink 1155. For example, the foot surface 1150 comprises a heat sink 1155. For example, the heat sink comprises a plurality of blades 1155B, for example equispaced blades. For example, the blades are blown by a source of air, for example comprising one or more ducts 1155D, for example directed towards the plurality of blades 1155B. For example, the foot surface 1150 comprises a heat sink 1155 that forms a surrounding second sector around a first sector 1151 that is proximal to the groove 1130.

For example, the flared end 1120 comprises a first flared end portion 1120-1 that is proximal to the groove 1130, is raised from the foot surface 1150 by a distance 1115Z, and separated by a second sector 1152 from a heat sink portion 1155 comprised in the foot surface 1150, and wherein the second sector 1152 forms a thermally insulating portion between the first flared end portion 1120-1 and the foot surface 1150. For example, the thermally insulating portion of the second sector 1152 comprises a thermally insulating material, for example one or more of: a ceramic, a glass, a polymer, a polymer foam, an elastomer, and a sandwich comprising a foam. For example, the second sector 1152 limits the thermal conductivity from the first flared end portion 1120-1 to the heat sink portion 1155 to a value less than 500 W/m$^2$/K. For example, the second sector 1152 comprises a structure comprising a plurality of ribs, for example comprising cutouts, mechanically linking first flared end portion 1120-1 to the heat sink portion 1155.

FIG. 1J is a bottom view of a pressure foot device 1100 comprising a groove the cross-section of which comprises one or more pairs of symmetrically opposing circular contour sectors. For example, the groove's cross-section comprises one or more pairs of symmetrically opposing circular contour sectors 1130C11, 1130C12, 1130C21, 1130C22 with respect to the midplane 1130MP, comprised at a groove depth greater or equal than that of the radius 1130MR of the greatest circular contour sectors. For example, the groove's cross-section comprises a second pair of opposing circular contour sectors 1130C21, 1130C22 that is located at a groove depth, for example along the groove midplane 1130MP, that is greater than that of a first pair of opposing circular contour sectors 1130C11, 1130C12.

FIG. 1K is a bottom view of a pressure foot device 1100 comprising a groove the cross-section of which comprises one or more U-shaped groove cross-sections that scale down into the groove. For example, the groove's cross-section comprises one or more U-shaped groove cross-sections 1130U1, 1130U2 that scale down into the groove 1130, for example along the groove midplane 1130MP. For example, an embodiment of a U-shaped groove 1130 comprises a semi-circular portion joining each side of the U. Other embodiments comprise for example, one or more of an elliptic, a parabolic, and a rounded portion joining each side of the U.

FIG. 1L is a bottom view of a pressure foot device 1100 comprising a groove the cross-section of which comprises 2 or more straight sides joined by a fillet. For example, the groove 1130 comprises a cross-section that comprises 2 or more straight sides 1130S1, 1130S2 joined by a fillet 1130F.

For example, the 2 or more straight sides 1130S1, 1130S2 are arranged symmetrically with respect to the groove midplane 1130MP. For example, an embodiment of the groove's cross section forms a half-rectangle comprising rounded corners.

For example, a distance between a groove's first lip 1141 and a groove's second lip 1142 is comprised in a range from 0.2 mm to 2 mm, for example in a range from 0.2 to 1 mm.

Figure 6A:
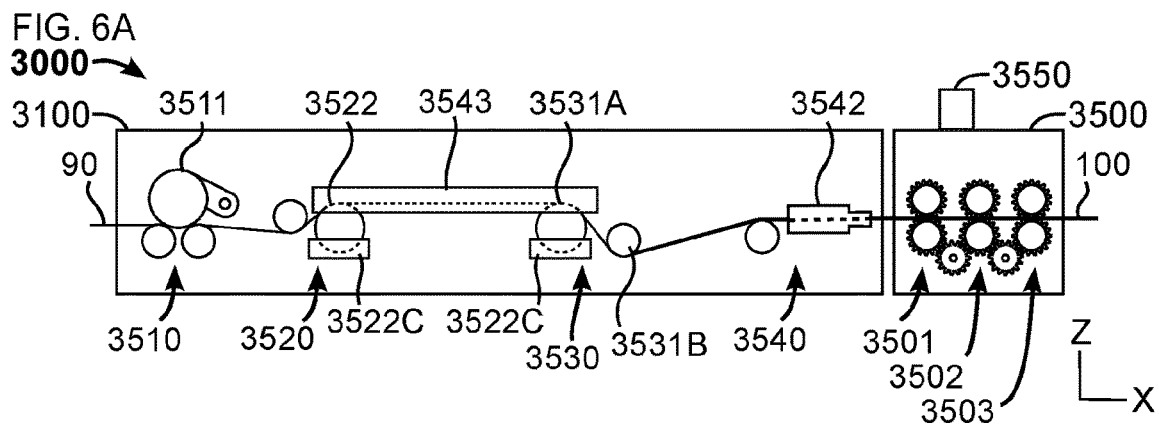
FIG. 6A is a side view of a tow forming assembly.
Figure 6B:
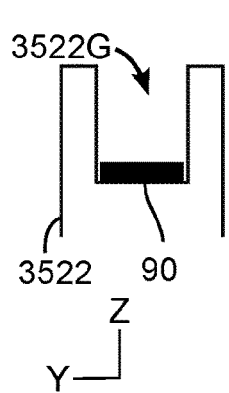
FIGS. 6B, 6C, 6D are cross sections of grooved wheels of the tow forming assembly.
Figure 6C:
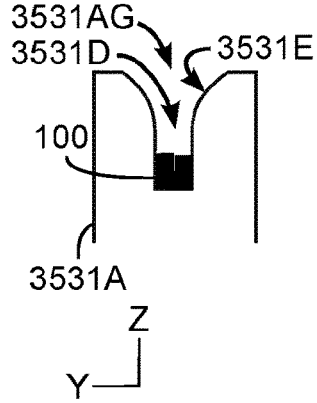
Figure 6D:
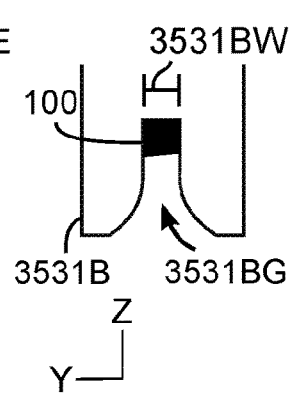
Figure 6E:
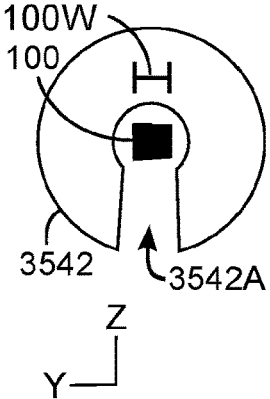
FIG. 6E is a cross section of a source of infrared radiation for heating the tow formed in the tow forming assembly.
Figure 7:
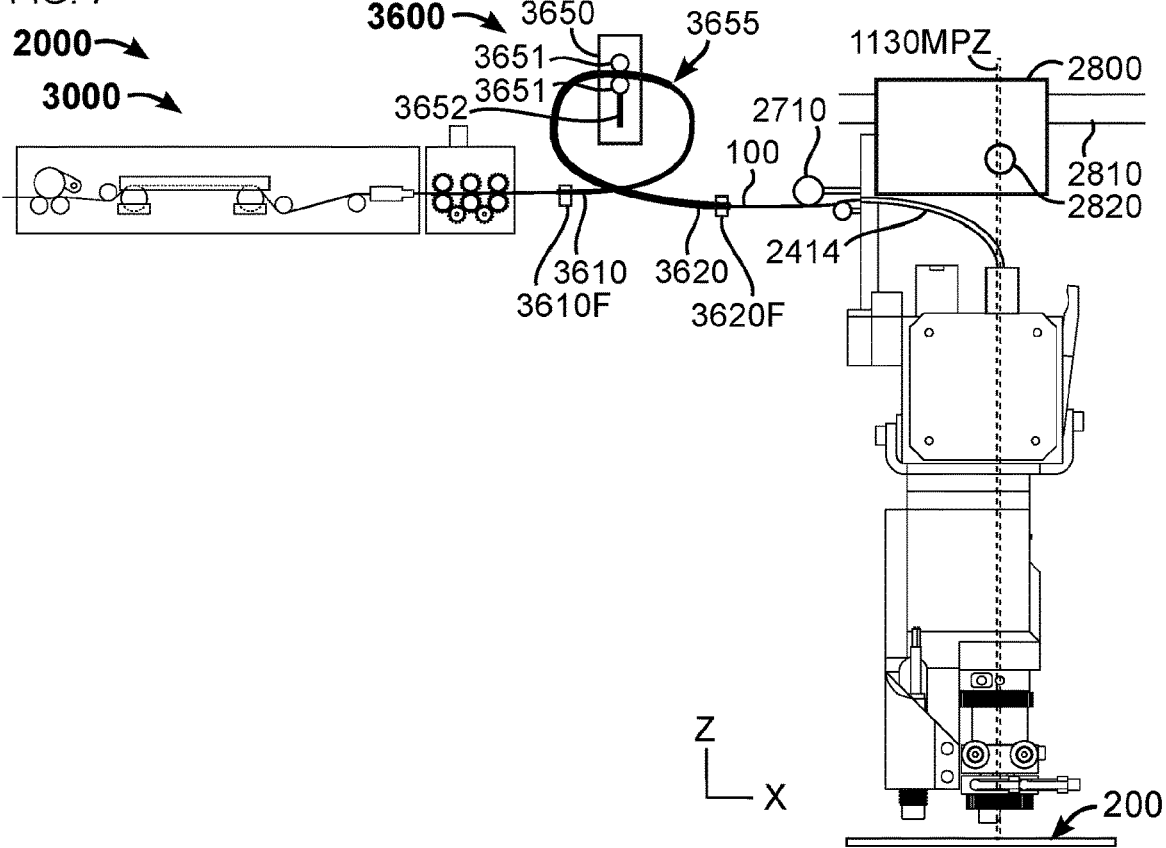
FIG. 7 is a side view of a system for applying an elongate fiber tow further comprising a slide head, a tow forming assembly, and a tow buffer.

For example, a groove 1130 that comprises a width, for example expressed as the lip-to-ip distance 1130W between a groove's first lip 1141 and a groove's second lip 1142, that is about equal to (for example by a margin of 2% to 20% greater, for example 5% to 15% greater, than the width of the tow 100) the width 100W of a tow 100 (FIG. 6E) comprising a rectangular cross-section, provides a method to constrain and guide the orientation of the tow 100 according to the orientation of the groove's midplane 1130MP and, by extension, the orientation of the straight foot segment 1110. For example, the lip-to-lip distance 1130W is greater than the width 100W of the tow 100 by a margin comprised in a range from 2% to 500%, for example from 2% to 300%, for example from 5% to 150%. For example, a tow 100 having a width 100W of about 0.4 mm is conveyed in a groove 1130 having a lip-to-lip distance 1130W in a range from 0.5 mm to 2 mm, for example 1 mm. For example, the width 100W of a tow 100 is formed and defined by the width 3531BW of a groove 3531BG of a grooved wheel 3531B (FIG. 6D) of a tow forming assembly 3000 (FIG. 6A). For another example embodiment, a tow 100 having a width 100W of about 0.8 mm is conveyed in a groove 1130 having a lip-to-lip distance 1130W in a range from 1 mm to 2 mm, for example 1 mm.

Figure 14:
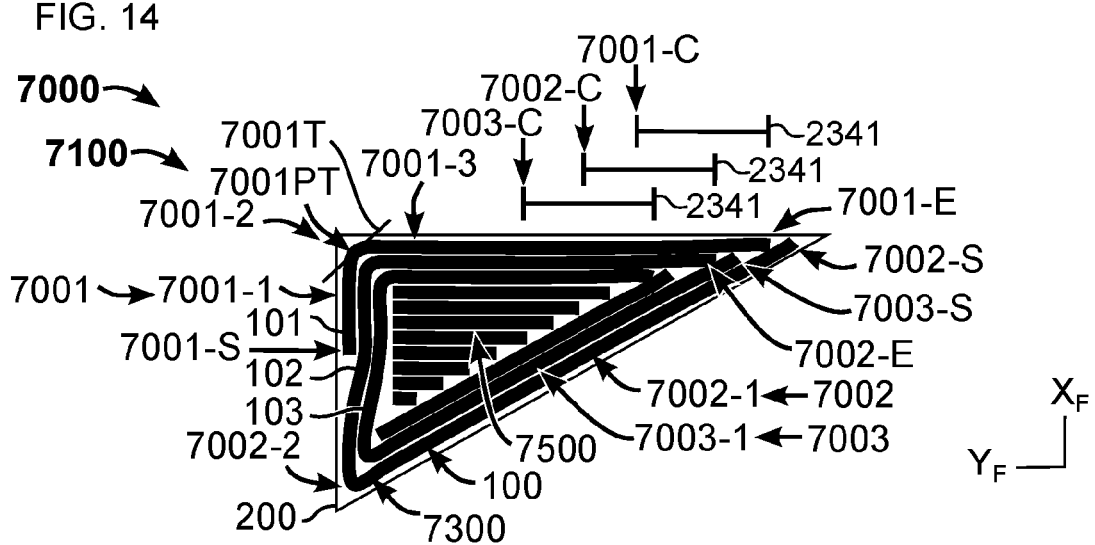
FIG. 14 is a top view of an object comprising a plurality of fiber tow segments.
Figure 15A:
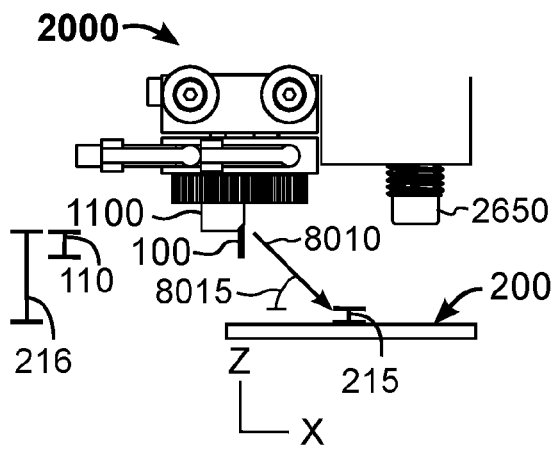
FIGS. 15A, 15B, 15C are side views of a system for applying an elongate fiber tow, each showing a landing trajectory.
Figure 15B:
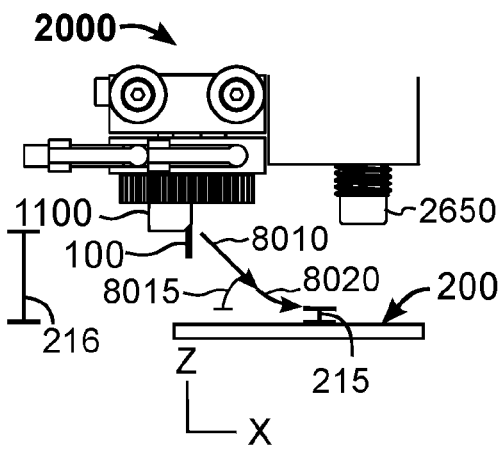
Figure 15C:
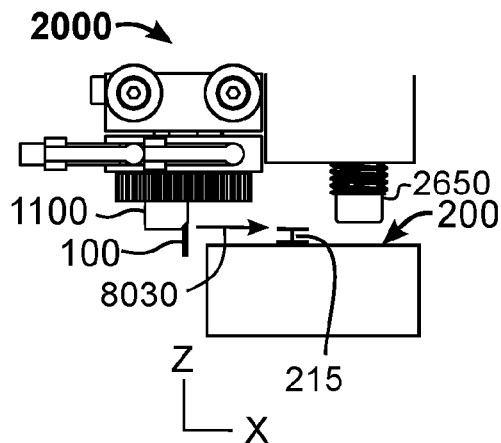

For example, a method that rotates the pressure foot device 1100 around the Z-axis also rotates the tow 100 around the Z-axis. For example, a method 5000, device, or system 2000 that rotates the tow 100 as it translates with respect to an object 200, provides a method to, compared to a non-rotated tow, increase the adhesion surface of the tow 100 onto the object surface 200 and increase the adhesive force between the tow 100 and the object surface. For example, a method 5000 for applying an elongate fiber tow (FIG. 12) comprises rotating 5310 the pressure foot device 1100, for example so that the angle of rotation matches the tangent 7001PT to the path of the pressure foot device 1100 (FIG. 14). For example, the method 5000 that comprises rotating the tow 100 as it is applied to a curved path 7001-2 onto an object surface 200 reduces the probability that the tow will unstick from the object surface 200 and form a shortcut with respect to the desired path for the tow. For example, the method 5000 of rotating the tow 100 within a groove 1300 that is about the same width as the tow 100, prevents loss of tow positioning precision, for example cause by unplanned lateral position jumping of the tow that is, for example, observed in systems feeding and translating a tow or filament within a channel that is substantially larger than the width of the tow 100.

Figure 2A:
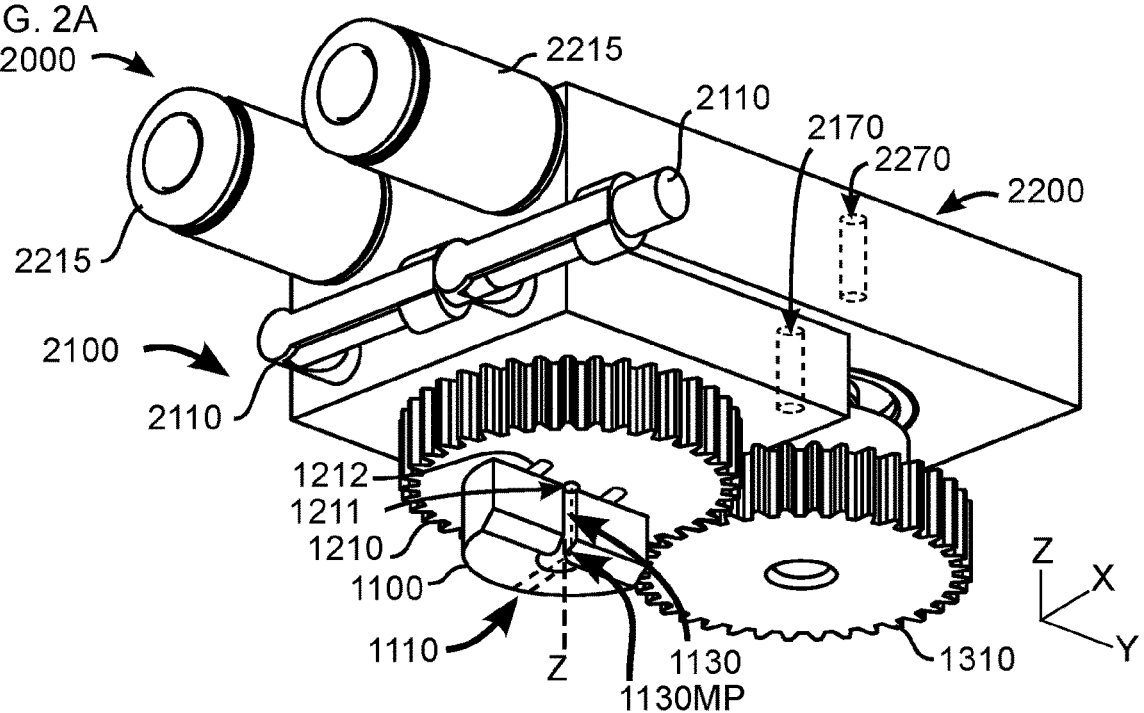
FIG. 2A is a perspective view of a system for applying an elongate fiber tow, comprising a pinion-driven pressure foot device, a foot shaft housing comprising heat sources, and a heat exchanger housing.
Figure 4A:
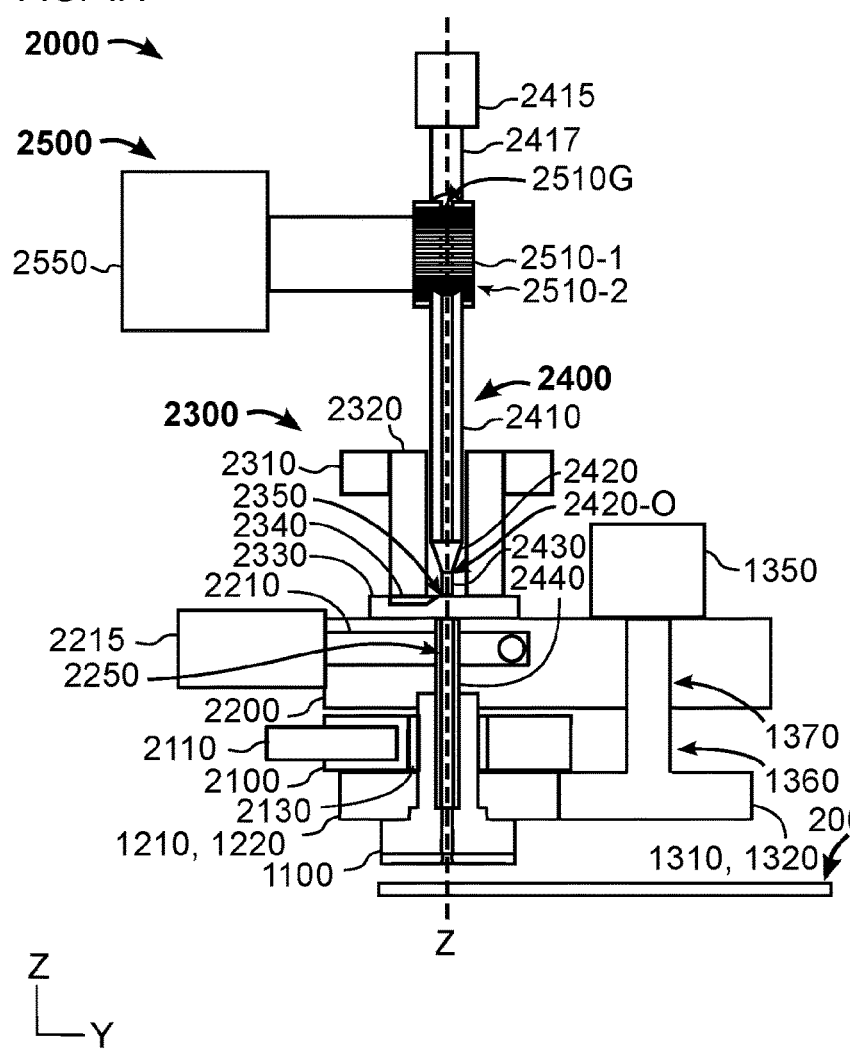
FIG. 4A is a frontal cross-section of a system for applying an elongate fiber tow.

FIG. 2A is a perspective view of a system 2000 for applying an elongate fiber tow, comprising a pinion-driven pressure foot device 1100, a foot shaft housing 2100 comprising one or more heat source 2110, and a heat exchanger housing 2200. FIG. 4A presents a cross-section of a system 2000 for applying an elongate fiber tow 100 onto an object surface 200, the system comprising a pressure foot device 1100. For example, the pressure foot device 1100 comprises a foot surface 1150, for pressing the fiber tow 100 onto the object surface 200, the foot surface 1150 comprising a straight foot segment 1110 for pressing the fiber tow 100 onto the object surface 200, the straight foot segment 1110 comprising a rear end 1112 and a front end 1111 that define a frontal direction Fx from rear end to front end; and a groove 1130 comprising a left lip 1141 and a right lip 1142, for guiding the tow to the foot surface 1150, the groove 1130 defining a groove midplane 1130MP as a planar portion along the groove's mid-line 1130ML between the left lip 1141 and the right lip 1142 of the groove 1130, the groove 1130 joining onto the front end 1111 of the straight foot segment 1110 and being oriented at an elevation angle 1130A with respect to the straight foot segment 1110, wherein the groove 1130 comprises a flared end 1120 that joins with the foot surface 1150; and a foot shaft housing 2100, characterized by a foot shaft's axis of rotation Z, defining a Z-axis, wherein the foot shaft's axis of rotation Z is orthogonal to the straight foot segment 1110 and comprised in the groove midplane 1130MP.

For example, the pressure foot device 1100 comprises a hollow foot shaft 1200, the axis of which is collinear with the foot shaft's axis of rotation Z and wherein a portion of the shaft forms a sliding fit within the foot shaft housing 2100. For example, the hollow foot shaft 1200 comprises a through hole that is concentric with the external diameter of the hollow foot shaft 1200. In some examples of a hollow foot shaft 1200, a portion of the shaft forms a running fit within the foot shaft housing 2100. For example, the foot shaft housing 2100 comprises one or more sources of heat 2110. A source of heat 2110 comprises, for example, one or more of: one or more electrically resistive elements; and one or more inductive elements, for example formed as one or more coils 2120, 2121, 2122, 2123.

For example, the system 2000 comprises a source of radiation 2140 comprising infrared radiation directed towards the groove 1130. For example, the source of radiation 2140 is comprised in a plane from the foot shaft's axis of rotation Z to the source of radiation 2140 that is coplanar with the groove midplane 1130MP. For example, the source of radiation 2140 comprises one or more electrically resistive elements, for example comprising one or more rods, for example oriented in a direction that is coplanar with the foot shaft's axis of rotation Z. For example, the source of radiation comprises a radiation reflector, for example oriented to reflect radiation towards one or more of the groove 1130, the flared end 1120, and the object surface 200. For example, the source of radiation 2140 comprises one or more optic fibers, for example to guide radiation emitted by one or more lasers towards one or more of the groove 1130, the flared end 1120, and the object surface 200.

Figure 3A:
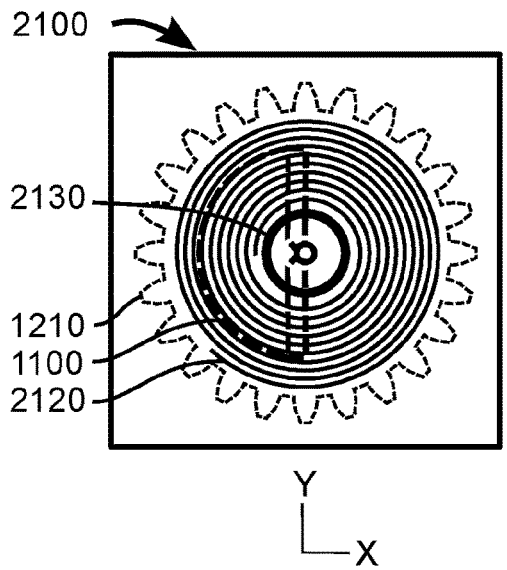
FIGS. 3A and 3B are top views of a foot shaft housing comprising one or more inductive coils as heat sources to the underlying pressure foot device.
Figure 3B:
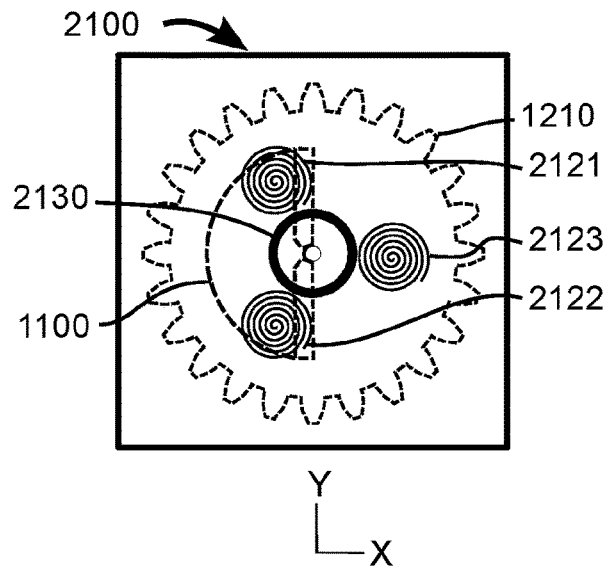

FIGS. 3A and 3B are top views of a foot shaft housing 2100 comprising one or more inductive coils as heat sources 2120, 2121, 2122, 2123 to the underlying pressure foot device 1100. For example, the foot shaft housing 2100 comprises one or more induction heating coils 2120, 2121, 2122, 2123. For example, the axis of one or more of the induction heating coils 2120, 2121, 2122, 2123 is parallel to that of the foot shaft's axis of rotation Z.

For example, the system comprises a temperature sensor 1170, 2170, 2270 comprised in one or more of: the foot shaft housing 2100; and the pressure foot device 1100. In some embodiments of the system 2000, a temperature sensor 2270 is comprised in a heat exchanger housing 2200. For example, the foot shaft housing 2100 comprises a cylindrical sleeve 2130 that is coaxial with the foot shaft's axis of rotation Z.

For example, the system 2000 comprises one or more pinch roller assemblies 2500.

Figure 4B:
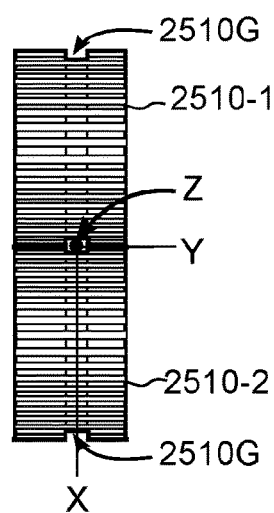
FIG. 4B is a top view of a pinch roller assembly comprised in a system for applying an elongate fiber tow.

FIG. 4B is a top view of the rollers of a pinch roller assembly 2500 comprised in a system for applying an elongate fiber tow 100. For example, one or more of the pinch roller assemblies 2500 comprises a first roller 2510-1 and a second roller 2510-2, wherein a tangent that is common to the first roller and to the second roller is collinear with the foot shaft's axis of rotation Z. For example, in some embodiments, the tangent that is common to the first roller and to the second roller is intersected by the foot shaft's axis of rotation Z.

Figure 5:
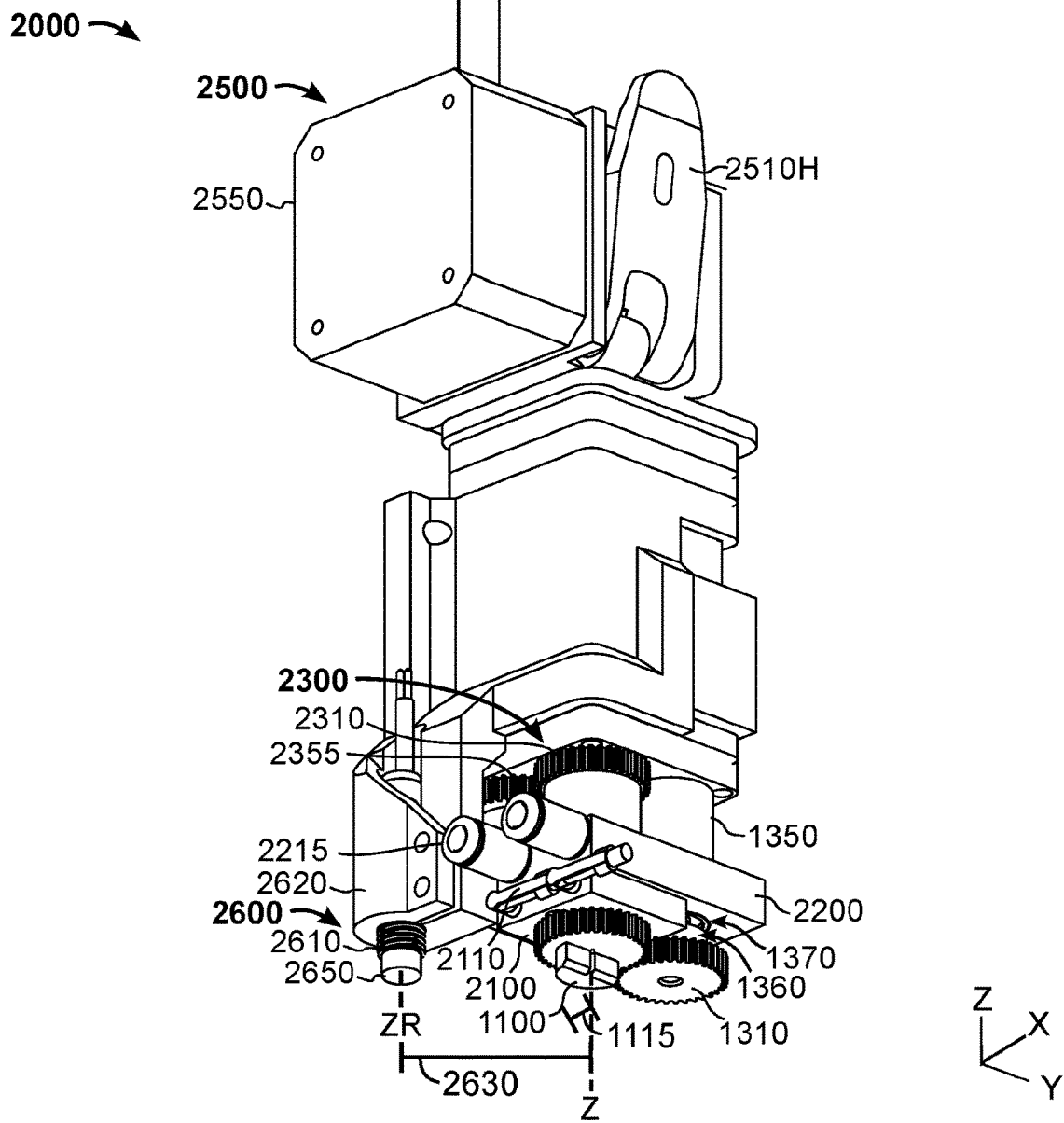
FIG. 5 is a perspective view of a system for applying an elongate fiber tow.

For example, one or more of the pinch roller assemblies 2500 comprises a first roller 2510-1 and a second roller 2510-2, wherein one or more of the rollers 2510-1, 2510-2 comprises a rectangular groove 2510G in the roller's perimeter. For example, the groove's cross section intersects the foot shaft's axis of rotation Z. For example, one or more of the first roller 2510-1 and the second roller 2510-2 can be separated away from the other roller or brought back against the other roller by acting, for example by a user, on the roller support handle 2510H (shown in FIG. 5). For example, the rotation axis of one or more of the rollers is supported by the roller support handle 2510H.

For example, the system 2000 comprises: an inlet 2415, for example comprising one or more of an inner cylindrical geometry for receiving a tube and a funnel for guiding a filament, for example a roving or tow, for example comprising one or more folds along the longitudinal axis, for example the Z-axis; and a tubular conduit 2417, for example for straightening and guiding the filament from the inlet 2415 into the groove 2510G.

For example, the system 2000 comprises a tow cutter assembly 2300 comprising an orifice 2350 and a blade 2340, the orifice 2350 intersecting the foot shaft's axis of rotation Z. For example, an embodiment of a tow cutter assembly 2300 comprises an ultrasonic cutter, for example a blade actuated at one or more ultrasonic frequencies.

For example, the system 2000 comprises a tow cutter assembly 2300 comprising a blade 2340 guided by a rail 2330 that is mechanically coupled to a rotatable 2320 ring, the rotation axis of which is collinear with the foot shaft's axis of rotation Z. For example, the rotatable ring is coupled to a driving assembly 2310 comprising, for example, one or more of: a gear; a pulley; and a motor 2355, for example a stepper motor.

For example, the system 2000 comprises a heat exchanger housing 2200 disposed between the foot shaft housing 2100 and one or more of the one or more pinch roller assemblies 2500, the heat exchanger housing 2200 comprising a first through hole 2250, the axis of which is collinear with the foot shaft's axis of rotation Z. In some embodiments of the system 2000, a temperature sensor 2270 is comprised in the heat exchanger housing 2200. For example, the heat exchanger housing 2200 is disposed between a tow cutter assembly 2300 and the foot shaft housing 2100.

Figure 2B:
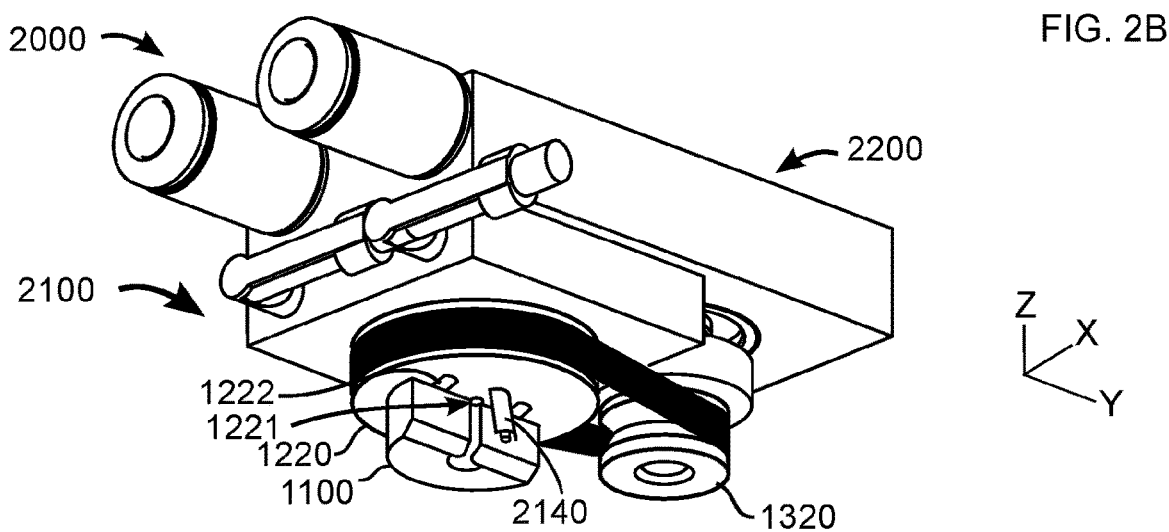
FIG. 2B is a perspective view of a system for applying an elongate fiber tow comprising a pulley-driven pressure foot device.
Figure 4C:
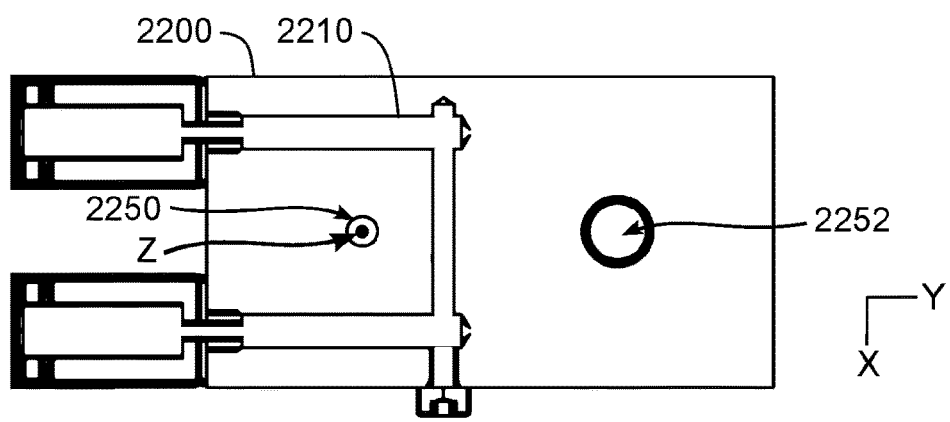
FIG. 4C is a top cross-section of a heat exchanger comprising one or more ducts.

FIG. 4C is a top cross-section of a heat exchanger housing 2200 comprising one or more ducts 2210. For example, the heat exchanger housing 2200 comprises one or more ducts 2210. For example the one or more ducts 2210 comprises one or more duct ports 2215, for example comprising a controllable valve or vane, for example for adjusting the flow of a fluid flowing inside the one or more ducts 2210. For example, the heat exchanger housing 2200 comprises a duct 2210 that forms a turning path of at least 180° around the foot shaft's axis of rotation Z. For example, a duct forms one or more semi-circle loops around the foot shaft's axis of rotation Z. For example, the heat exchanger housing 2200 comprises a second through hole 2252, the axis of which is parallel to the foot shaft's axis of rotation Z. For example, the heat exchanger housing 2200 comprises a drive shaft 1360 that forms a coupling with the pressure foot device 1100. For example, the drive shaft comprises a pinion 1310 that is coupled with the pressure foot pinion 1210. For another example, as shown in FIG. 2B, the drive shaft comprises a pulley 1320 that is coupled with the pressure foot pulley 1220.

For example, the heat exchanger housing 2200 forms a thermally conductive contact 1370 with a drive shaft 1360 that forms a coupling with the pressure foot device 1100, wherein the contact's interfacial conductance is greater than 500 W/m²/K.

For example, the heat exchanger housing 2200 comprises a tow duct 2400, wherein the tow duct comprises an entry portion 2410 and an exit portion 2420, and wherein the exit portion's axis of symmetry is comprised in the groove midplane 1130MP.

For example, a portion of the tow duct 2400 comprises a convergent tow duct nozzle or funnel 2420, the outlet 2420-O of the convergent tow duct nozzle being oriented towards the groove 1130, and wherein the axis of symmetry of the outlet 2420-O is comprised in the groove midplane 1130MP. For example, the tow duct 2400 comprises an exit duct 2430, for example aligned with the foot shaft's axis of rotation Z, for example having an inner diameter that is inferior to that of the inner diameter of the portion of tow duct 2400 comprised between the rollers 2510-1, 2510-2 and the tow duct nozzle or funnel 2420. For example, the system 2000 comprises a duct extension 2440, the axis of which is aligned with the pressure foot device's axis of rotation Z. For example, the duct extension is aligned with the tow duct 2400. In some embodiments, the duct extension passes, for example, through one or more of: the through hole 2250, the foot shaft housing 2100; and a portion of the pressure foot device 1100, for example a portion of the pressure foot device passing through the foot shaft housing 2100.

For example, the system 2000 comprises one or more rangefinding detector assemblies 2600 each comprising a rangefinder 2650, one or more of the rangefinder's measurement axes ZR being oriented along a direction parallel that of the foot shaft's axis of rotation Z, wherein the distance 2630 from the rangefinding detector's measurement axis ZR to the foot shaft's axis of rotation Z is greater than the distance 1115 from the foot shaft's axis of rotation Z to the straight foot segment's rear end 1112 and less than 20 cm.

For example, one or more of the one or more rangefinding detector assemblies 2600 comprises a translation stage 2610. For example, the translation stage 2610 provides a method to adjust the position of the one or more rangefinding detector assemblies 2600 with respect to the pressure foot device 1100.

For example, the system 2000 comprises a tow forming assembly 3000, for example supported by a tow forming assembly chassis 3100. For example, the tow forming assembly chassis 3100 comprises one or more of: a tape orienter and tensioner assembly 3510; a tape pre-heating assembly 3520; a tape heater 3543; a tow forming assembly 3530; and a tow heating assembly 3540. For example, the tow forming assembly 3000 comprises one or more grooved wheels 3522, 3531A, 3531B wherein at least a portion of the groove's cross-section is rectangular. For example, the tow forming assembly 3000 comprises a tape orienter and tensioner assembly 3510, for example comprising a wheel 3511, for example comprising a flat-bottomed groove, for example configured to apply a load, for example via a weight, a spring, or a servomotor, onto the tape 90. For example, the tow forming assembly 3000 comprises a tape pre-heating assembly 3520. For example, the tape pre-heating assembly 3520 comprises one or more of: a first grooved wheel 3522 comprising, for example, a flat-bottomed groove 3522G; and a wheel cooler 3522C. For example, the wheel cooler comprises one or more of: an air blower, for example comprising an air supply and one or more orifices, for example in the tow forming assembly's chassis 3100; and a cooling bath, for example comprising water.

For example, the tow forming assembly 3000 comprises a tape post-heating assembly or first tow forming assembly 3530. For example, the cross-section of the groove of one or more second grooved wheels 3531A, 3531B comprises a V-shaped groove entry 3531E and a rectangular-shaped groove depth 3531D. For example, the tape 90 is folded into a tow 100 at the second grooved wheel 3531A. For example, the first tow forming assembly 3530 comprises a wheel cooler 3522C.

For example, the system 2000 comprises one or more sources of infrared radiation 3542, 3543 directed towards the path of the tow 100. For example, a tape-heating source of infrared radiation 3543 is comprised between the first grooved wheel 3522 and the second grooved wheel 3531A. For example, the tow heating assembly 3540, for example comprising a tow-heating source of infrared radiation 3542, is comprised down-tow of one or more of the second grooved wheel 3531A, 3531B, for example at a tow heating assembly 3540 of the tow forming assembly 3000. For example, the tow-heating source of infrared radiation 3542 comprises an aperture 3542A for one or more of: inserting the tow; enabling visual monitoring of the tow; and heating only a portion of the tow's periphery.

For example, the system 2000 comprises a tow tractor assembly 3500. For example, the tow tractor assembly is located down-tow of the tow forming assembly's chassis 3100. For example, the tow tractor assembly 3500 comprises one or more pinch roller assembly 3501, 3502, 3503, for example 3 pinch roller assemblies. For example, the one or more pinch roller assembly 3501, 3502, 3503 is driven by a tow tractor assembly motor 3550. For example, tow tractor assembly 3500 comprises one or more of: a speed sensor, for example to measure or estimate tow speed, for example as one or more of a wheel encoder or resolver mounted on one or more of the pinch roller and an optical sensor, for example monitoring the tow; a tension sensor, for example mounted on one or more of the pinch roller; and a motor power sensor, for example to estimate tension in the tow.

For example, the system 2000 comprises a tow buffer assembly 3600. For example, the tow buffer assembly 3600 comprises one or more flexible tubing assemblies comprising a first tube 3610 and a second tube 3620, wherein the outer diameter of the first tube is less than the inner diameter of the second tube and wherein the first tube is slidingly inserted into the second tube. For example, the buffer assembly 3600 wherein the outer diameter of the first tube is less than the inner diameter of the second tube enables a method wherein the first and the second tube slide, for example telescopically, with respect to each other as the tension on the tow 100, that passes within the first tube 3610 and the second tube 3620, successively increases and decreases as the tow 100 is supplied by the tow forming assembly 3000 and demanded by the pinch wheel assembly 2500. For example, the first tube 3610 and the second tube 3620 slide into each other telescopically and form a loop 3655. For example, the tow entrance of the first tube 3610 is anchored by a first fastener 3610F. For example, the tow exit of the second tube 3620 is anchored by a second fastener 3620F. For example, one or more of the first tube 3610 and the second tube 3620 is constrained by a unidirectional restraint 3650 to allow motion of the tubes 3610, 3620 in a single direction, for example a loop's radial direction. For example, the unidirectional restraint 3650 comprises one or more restraint rollers 3651, for example 2 restraint rollers 3651. For example, the restraint rollers 3651 are slidingly mounted to a rail 3652, for example oriented in a loop's radial direction, for example a direction orthogonal to the direction at which the tow exits the tow forming assembly 3000, for example a vertical direction. For example, one or more of the restraint rollers 3651 is spring-loaded along the rail's direction. In some embodiments, the unidirectional restraint 3650 comprises a sensor, for example a position sensor, for example a strain gauge, to detect one or more of the loop's tension and geometry.

For example, the system 2000 comprises a tow longitudinal tension detector 2710. For example, the tension detector 2710 comprises for example one or more wheels, for example one or more sliders, that is configured to be in contact with the tow 100 at a first end and coupled to a force measurement sensor, for example a strain gauge at a second end.

For example, the system 2000 comprises a slide head 2800 comprising one or more axes 2810, 2820. For example, the slide head 2800 comprises a first axis 2810 that is orthogonal to a second axis 2820. For example, one or more of the one or more axes 2810, 2820 is intersected by the Z-wise extended groove midplane 1130MPZ that extends the groove midplane 1130MP in the Z-direction.

For example, one or more of the one or more axes 2810, 2820 comprises two orthogonal axes 2810, 2820, the intersection point of which is about on the Z-wise extended groove midplane 1130MPZ that extends the groove midplane 1130MP in the Z-direction. For example, the intersection point is comprised within a radius from the Z-axis that is equal to 3 diameters of the axis of greatest diameter.

For example, the system 2000 comprises a support chassis comprising a tubular clamp 2620, the axis of which is parallel to the foot shaft's axis of rotation Z.

For example, the system 2000 comprises one or more of a pinch roller motor 2550 coupled to one or more pinch roller assemblies 2500, a tow cutter motor 2350 coupled to a tow cutter assembly 2300, and a foot rotation motor 1350 coupled to the pressure foot device 1100.

For example, the system 2000 comprises a dispenser nozzle outlet 2940 for dispensing a thermoplastic material onto the object surface 200. For example, the dispenser nozzle outlet is adapted to dispense a thermoplastic material that comprises one or more of: a metal, for example a metal powder; chopped fibers, for example comprising chopped carbon fibers; a silicate, for example sand; a ceramic; a powder, for example a carbon black powder; a silicone; a foam, for example a urethane, a polyurethane, or a polystyrene foam; and an elastomer.

For example, the system 2000 comprises a dispenser nozzle assembly 2900. For example, the dispenser nozzle assembly 2900 comprises: an inlet 2915, for example comprising one or more of an inner cylindrical geometry for receiving a tube and a funnel for guiding a filament, for example a thermoplastic material filament; one or more rollers 2910-1, 2910-2, for example comprising a groove 2910G in the roller's perimeter, and driven by a pinch roller motor 2950; a tubular conduit 2917, for example for straightening and guiding the material filament from the inlet 2915 into the groove 2910G; and a duct 2920, for example for guiding the material filament to the nozzle 2940.

For example, the system 2000 comprises a dispenser nozzle extension actuator 2930 to adjust the Z-axis position of the dispenser nozzle's outlet 2940.

For example, the Z-axis position of the dispenser nozzle's outlet 2940 is offset from the Z-axis position of the straight foot segment 1110 by an offset 2980 comprised in a range from −4 mm to +4 mm.

FIG. 9 is a perspective view of a system 2000 for applying an elongate fiber tow mounted on a robotic manipulator 3800. For example, the system 2000 comprises a robotic support 3800 to configure one or more of the position and speed of the pressure foot device 1100 at one or more spatial positions ($X_F$, $Y_F$, $Z_F$) and one or more spatial orientations ($\varphi_F$, $\theta_F$, $\psi_F$). For example, the robotic support comprises one or more motor 3810, 3820, 3830, 3840, 3850 to actuate one or more joint for configuring the pressure foot device, placed for example at a robot's end-effector location, into a spatial position and orientation.

FIG. 1I presents a block diagram of a computer system 4000. For example, the system 2000 comprises the computer system 4000. For example, the computer system 4000 comprises one or more of a digital processor 4110, a computer-readable non-volatile storage device or medium 4120, a user interface device 4130, a data bus 4150 connected to one or more sensors 4170, 2650, 2710, 2170, 2270 and actuators 4180, 1350, 2550, 2120, 2121, 2122, 2123, 2300, 2110, 3000 comprised in the system, a memory 4160, and a communication interface device 4140 for transferring data between one or more of the digital processor 4110, the computer-readable non-volatile storage device 4120, the data bus 4150, the user interface device 4130, and one or more external systems 4200 external to the system comprising one or more of a processor, a storage device, a user interface, an actuator, and a sensor.

FIG. 12 presents a block diagram of a method 5000, for example a computer-based method comprising computer-readable instructions stored in a non-transitory storage medium, for applying an elongate fiber tow 100 onto an object surface 200, the method comprising: translating 5100 an elongate fiber tow 100 into a groove 1130 of a pressure foot device 1100 unto a foot surface 1150 of the pressure foot device 1100, the groove 1130 comprising a left lip 1141, a right lip 1142, and defining a groove midplane 1130MP along the groove's mid-line 1130ML and extending until between the left lip 1141 and the right lip 1142 of the groove 1130; guiding 5200 the fiber tow within the groove to a flared end 1120 of the groove; curving 5230 the fiber tow around the flared end of the groove to a straight foot segment 1110 comprised in the foot surface 1150 of the pressure foot device, wherein the straight foot segment 1110 comprises a rear end 1112 and a front end 1111 that define a frontal direction Fx from the rear end to the front end, and the groove 1130 joining onto the front end of the straight foot segment 1110 and being oriented at an elevation angle 1130A with respect to the straight foot segment; and pressing 5240 the fiber tow between the straight foot segment and the object surface 200.

For example, one or more of translating 5100, guiding 5200, curving 5230, and pressing 5240 comprises heating 5210 the fiber tow 100. For example, pressing 5240 comprises cooling 5250 the fiber tow 100. For example a method of cooling the fiber tow 100 comprises contacting the fiber tow 100, for example pressing the fiber tow 100 with the distal portion (with respect to the groove 1130) or the heat sink portion 1155 of the pressure foot device 1100. For example, pressing 5250 comprises a first step that comprises heating 5210 the fiber tow 100 and a second step that comprises cooling 5250 the fiber tow 100.

For example, the method 5000 comprises adjusting electrical power 5220 delivered to one or more sources of heat 2110, 2120, 2121, 2122, 2123, 2140 for heating the fiber tow 100.

For example, the method 5000 comprises rotating 5310 the pressure foot device 1100 around an axis of rotation Z that is orthogonal to the straight foot segment 1110 and comprised within the groove midplane 1130MP. For example, the method 5000 comprises translating 5320 the pressure foot device 1100.

FIG. 14 is a top view of an object 7000 comprising a layer of tows 7100 comprising a plurality of fiber tow segments 101, 102, 103. For example, the method 5000 comprises one or more of translating 5320 and rotating 5310 the pressure foot device 1100 along a path 7001, 7002, 7003 from a path start 7001-S to a path end 7001-E, wherein the straight foot segment 1110 is collinear with a tangent 7001T to the path of the pressure foot device 1100 and the point of tangency 7001PT to the path 7001 is comprised within the groove midplane 1130MP. For example, the method 5000 comprises simultaneous translation and rotation. A method to form a spiral path 7300 comprises forming one or more paths, for example successively arranged paths 7001, 7002, 7003, that form a spiral arrangement. For example, the method 5000 comprises forming an internal region 7500, also called an infill 7500, that fills the area or volume, for example in a plurality of stacked rows or layers 7100, comprised within one or more of the external contour formed by the path 7001, 7002, 7003 of the object 7000.

For example, the fiber tow 100 is translated within the groove 1130 at a speed equal to the speed at which the point of tangency 7001PT to the path 7001 translates along the path.

For example, the method 5000 comprises forming a cut 5330 in the fiber tow 100 at the location 7001-E where the radius of curvature of the path is one or more of: less than 2 mm; less than 3 mm; and less than 5 mm. For example, the radius of curvature of the path is a path that is planned by one or more path instructions, for example generated by a computer-based path-planning system. For example, the path is segmented at locations where the path plan comprises a radius of curvature that is below a threshold, for example a threshold of one or more of: less than 2 mm; less than 3 mm; and less than 5 mm.

For example, the method 5000 comprises actuating 5340 a tow cutter assembly 2300 at a location 7001-C, 7002-C, 7003-C along the path 7001, 7002, 7003 that is ahead of the path end by a path length 2341 equal to the length 2341 of fiber tow from the tow cutter assembly's blade 2340 to the front end 1111 of the straight foot segment 1110.

For example, the method 5000 comprises unwinding 3545 the tow 100 wherein unwinding comprises rotating 5310 the pressure foot device 1100.

For example, the method 5000 comprises forming a measurement 5350 of a distance 205 between the straight foot segment 1110 and the object surface 200. For example the distance corresponds to a height along the Z-axis.

For example, the method 5000 comprises adjusting 5360 a distance 205 between the straight foot segment 1110 and the object surface 200. For example, adjusting a distance 205 is a function of one or more measurements of a distance from the object surface 200, for example acquired with one or more of the rangefinding detector assemblies 2600. For example, the method 5000 comprises adjusting 5370 a distance 206 between a dispenser nozzle 2940 and the object surface 200. For example, adjusting a distance 206 is a function of one or more measurements of a distance from the object surface 200, for example acquired with one or more of the rangefinding detector assemblies 2600. For example, the method 5000 comprises adjusting 5380 a distance offset 2980, for example along the Z-axis, of the dispenser nozzle 2940 with respect to the object surface 200 as a function of a distance 205 between the straight foot segment 1110 and the object surface 200.

For example, the method 5000 comprises: translating 5100 the fiber tow 100 within the groove 1130 by a length 110 comprised in a range from 2 mm to 30 mm; and guiding the pressure foot device 1100 along a landing trajectory 8010, 8020, 8030 onto the object surface 200.

For example, the method 5000 comprises forming 5110 one or more folds along the length of the fiber tow 100 by passing a fiber tape 90 within one or more grooves comprising a rectangular cross-section. For example, passing comprises engaging the fiber tape 90 into and out of one or more grooves, for example a static groove, for example the groove of one or more grooved wheels. For example, the passing results in one or more of: aligning the tape 90; compressing the tape 90; and folding the tape 90, for example into a tow 100.

For example, the forming 5110 one or more folds comprises passing the fiber tape 90 within one or more grooves 3522G, 3531AG, 3531BG that are comprised on one or more grooved wheels 3522, 3531A, 3531B.

For example, the method 5000 comprises acquiring 5120 measurements of the longitudinal tension of the fiber tow 100 from a tow longitudinal tension detector 2710.

For example, the method 5000 comprises adjusting 5130 the speed of the translating 5100 of the tow 100 as a function of measurements of the longitudinal tension of the fiber tow 100 from a tow longitudinal tension detector 2710.

FIG. 13 presents a block diagram of instructions 6000 for a method comprised in a computer-readable non-volatile storage device 4120. For example, the instructions 6000 or parts thereof, are representative of a method, for example a computer-implemented method. For example, the computer-readable non-volatile storage device 4120 comprises executable instructions 6000 that, when executed by one or more processors 4110 of a system 2000 for applying an elongate fiber tow 100 onto an object surface 200, cause the system 2000 to at least: a) command 6100 one or more of position and speed of a first tow entrainment motor 2550, causing an elongate fiber tow 100 to translate along a groove 1130 of a pressure foot device; and b) command 6310 one or more of position and speed of a second motor 1350 coupled to a pressure foot device 1100 and causing the pressure foot device to rotate, wherein the pressure foot device 1100 comprises a foot surface 1150 for pressing the fiber tow 100 onto the object surface 200, the foot surface 1150 comprising a straight foot segment 1110 for pressing the fiber tow 100 onto the object surface 200, wherein the straight foot segment 1110 comprises a rear end 1112 and a front end 1111 that define a frontal direction Fx from rear end to front end, and wherein the pressure foot device 1100 rotates around an axis of rotation Z that is orthogonal to the straight foot segment 1110 and comprised within a groove midplane 1130MP along a groove's mid-line 1130ML comprised between a left lip 1141 and a right lip 1142 of the groove.

For example, the instructions 6000 comprise instructions for a method wherein the speed at which the first motor 2550 is commanded 6315 is a function of the speed at which the second motor 1350 is commanded 6310.

For example, the instructions 6000 further comprise instructions for a method to command 6315 a third motor 2350 coupled to a tow cutter assembly 2300 and causing the tow cutter assembly to displace a blade 2340 from a first position to a second position. For example, the instructions 6000 comprise instructions 6330 to command a cut in the tow as a function of the curvature of the path 7001, 7002, 7003 of the tow, for example at a point of tangency 7001PT (see FIG. 14). For example, the cut is commanded upon reaching a cut position 7001-C, 7002-C, 7003-C to form a complete cut across the entirety of the tow's cross-section. For example, the cut is commanded to form a partial cut across a portion of the tow's cross-section. For example, the extent of the cut across the tow's cross-section is a function, for example a linear function, of the path's radius of curvature, for example at a point of tangency 7001PT.

For example, the instructions 6000 comprise instructions for a method to adjust the speed 6345 of the first motor 2550 as a function of a command sent to the third motor 2350.

For example, the instructions 6000 comprise instructions for a method to acquire 6350 rangefinder measurement data from one or more rangefinding detector assemblies 2600.

For example, the instructions 6000 comprise instructions for a method to adjust 6355 the speed of the first motor 2550 as a function of measurements acquired from the one or more rangefinding detector assemblies 2600.

For example, the instructions 6000 comprise instructions for a method to acquire 6120 measurement data from one or more tow longitudinal tension detectors 2710.

For example, the instructions 6000 comprise instructions for a method to adjust 6130 the speed of the first motor 2550 as a function of measurements acquired from one or more of the one or more tow longitudinal tension detectors 2710.

For example, the instructions 6000 comprise instructions for a method to adjust 6135 the relative speed of one or more first motors 2550, 3550 as a function of measurements acquired from one or more of one or more tow longitudinal tension detectors 2710.

For example, the instructions 6000 comprise instructions for a method to adjust 6220 infrared radiation power of one or more of: one or more source of infrared radiation 3542, 3543, 2140; and one or more sources of heat 2110, 2120, 2121, 2122, 2123. For example, the instructions to adjust 6220 infrared radiation power comprised adjusting an electrical power supply, for example in one or more of voltage, current, and duty cycle. For example, the instructions 6000 comprise instructions to adjust 6250 tow cooling. For example, one or more of the instructions to adjust 6220 infrared radiation power and the instructions to adjust 6250 tow cooling comprise instructions to adjust as a function of one or more of: tow tension measurement; tow translation speed; the speed of one or more motors 2550, 3550, 2950; the speed of one or more wheels 3522, 3531; one or more tow cross-sectional dimension; one or more thermoplastic material cross-sectional dimension; the rotational speed of one or more rollers 2510-1, 2510-2, 2910-1, 2910-2; the temperature measured by one or more temperature sensor 1170, 2170, 2270; a relative amount of thermoplastic material comprised in a tow, for example in a tow cross-section; and an ambient temperature measurement. For example, the instructions to adjust 6250 tow cooling comprise instructions to adjust one or more of: the flow rate of a cooling fluid, for example of a cooling fluid flowing inside the heat exchanger housing 2200, for example by sending one or more commands to one or more flow control devices, for example a valve or a vane, for example comprised in the one or more ports 2215.

For example, the instructions 6000 comprise instructions to store 6400 one or more numerical toolpath instructions 7001-S, 7001-1, 7001-2, 7001-3, 7001-E, 7002-S, 7002-1, 7002-2, 7002-E, 7003-S, 7003-1 comprising one or more of position and orientation of the pressure foot device 1100.

For example, the instructions 6000 comprise instructions for a method to insert 6405 one or more commands for a third motor 2350 coupled to a tow cutter assembly 2300 into the numerical toolpath instructions 7001-S, 7001-1, 7001-2, 7001-3, 7001-E, 7002-S, 7002-1, 7002-2, 7002-E, 7003-S, 7003-1 as a function of one or more of a path length and one or more path curvatures.

For example, the instructions 6000 comprise instructions for a method to insert 6405 one or more instructions to command unwinding 6406 of the tow 100, the instructions comprising commands to actuate the second motor 1350.

FIG. 10 is a top view of a system 2000 for applying an elongate fiber tow comprised in an X-Y gantry 3900 that further comprises a Z-wise actuated object support 3932. For example, the gantry 3900 comprises an X-motor 3910 for translating one or more of the pressure foot device 1100 and the system 2000 in the X-direction and a Y-motor 3920 for translating in the Y-direction. For example, the gantry 3900 comprises a Z-motor 3930 for actuating the object support 3932 in the Z-direction. For example, the instructions 6000 comprise instructions for a method to command 6320 one or more motors 3810, 3820, 3830, 3840, 3850, 3910, 3920, 3930 to configure one or more of the position and speed of the pressure foot device 1100 at one or more spatial positional coordinates $X_F$, $Y_F$, $Z_F$ and one or more spatial orientation coordinates.

For example, the instructions 6000 comprise instructions for a method to adjust 6360 the distance 205 between the straight foot segment 1110 and the object surface 200, for example by commanding one or more motors 3820, 3830, 3840, 3850, 3930 to configure one or more of the position ($X_F$, $Y_F$, $Z_F$; $\varphi_F$, $\theta_F$, $\psi_F$) and speed of the pressure foot device as a function of measurements acquired from one or more rangefinding detector assemblies 2600. For example, adjusting a distance 205 comprises instructions wherein the distance is a function of one or more measurement data of a distance from the object surface 200, for example data acquired from one or more of the rangefinding detector assemblies 2600.

For example, the instructions 6000 comprise instructions 6360 for a method to adjust the distance 205 between the straight foot segment 1110 along the axis of rotation Z and the object surface 200 to a value comprised in a range from 0.05 mm to 1.0 mm. For example, the value is comprised in a range from 0.15 mm to 0.5 mm, for example from 0.2 mm to 0.3 mm, for example 0.25 mm.

For example, the instructions 6000 comprise instructions 6360 for a method for translating and rotating the pressure foot device 1100 along a path 7001, 7002, 7003 from a path start 7001-S, 7002-S to a path end 7001-E, 7002-E, wherein the second motor 1350 is commanded so that the straight foot segment 1110 remains collinear with the local tangent 7001T to the path 7001, 7002, 7003 of the pressure foot device 1100 and the point of tangency 7001PT remains comprised within a segment extending from the straight foot segment's front end 1111 into the length of the groove's mid-line 1130ML. For example, the translating and the rotating are simultaneous.

For example, the instructions 6000 comprise instructions 6370 for a method to adjust the distance 206 between the nozzle 2940 and the object surface 200. For example, the instructions 6370 to adjust the distance 206 are a function of one or more of: the distance 206 between the nozzle 2940 and the object surface 200; the offset, for example along one or more of the X-, the Y- and the Z-axis, of the nozzle 2940 with respect to the pressure foot device 1100, for example the Z-axis through the axis of rotation of the pressure foot device; the three-dimensional geometrical characteristics of the object surface; the speed of one or more of the pressure foot device 1100 and the nozzle 2940 with respect to the object surface 200; and the three-dimensional geometrical characteristics of the path 7001, 7002, 7003, for example characterized by the curvature of a curved portion of the path comprised between two straight portions in one or more of the X-, Y-, and Z- dimensions, for example at the point of tangency 7001PT at maximum curvature of the curved portion. For example, forming a path comprising a portion comprising one or more curve or curved portion comprises decreasing the distance 206 between the nozzle 2940 and the object surface 200 within the curved portion in comparison with the distance 206 in a straight portion, for example as a function of speed, for example comprising a rule that comprises a linear function of speed.

For example, the instructions 6000 comprise instructions 6380 for a method to adjust the distance offset, for example along one or more of the X-, the Y- and the Z-axis, between the pressure foot device 1100 and the nozzle 2940. For example, the instructions 6380 to adjust the distance offset are a function of the three-dimensional geometrical characteristics of the path 7001, 7002, 7003, for example to follow changes in elevation in a path, for example to maintain a constant height of the nozzle 2940 with respect to the object surface 200.

For example, the instructions 6000 comprise instructions 6390 for a method to guide the pressure foot device 1100 along a landing trajectory 8010, 8020 onto the object surface 200. The landing trajectory comprises, for example, a trajectory portion 8030 that is parallel to the object surface 200, for example at a distance or altitude 205 with respect to the object surface 200 that is equal to that of the thickness 215 of a pressed filament or folded tow, for example comprised in a range from about 30 µm to about 3 mm, for example from about 50 µm to about 1 mm, for example from about 100 µm to about 400 µm. For example, the landing trajectory reaches a distance or altitude with respect to the object surface 200 prior to the foot shaft's axis of rotation Z being brought over the object surface 200. For example, the landing trajectory comprises a round out 8020 to, for example, blend a descending trajectory 8010, for example a straight line descending trajectory, towards the object surface with a trajectory portion that is parallel to the object surface. For example, a tangent, for example prior to the round out 8020, of the descending trajectory 8010 forms an angle with respect to the object surface 200 comprised in a range from 0° to 90°, for example from 3° to 60°, for example from 3° to 45°. For example, the landing trajectory is commanded with the rangefinder 2650 positioned ahead of the pressure foot device 1100. For example, the landing trajectory is initiated from an initial approach height 216 comprised in a range from 100 mm to 30 µm, for example from 50 mm to 30 µm with respect to the object surface. For example, the instructions 6390 to guide the pressure foot device along a landing trajectory comprise instruction to wind out an initial tow length 110, for example for anchoring the tow to the surface, beyond the pressure foot device's foot surface 1150. For example, the initial tow length 110 has a range from 0.5 mm to 50 mm, for example from 1 mm to 30 mm, for example from 2 mm to 25 mm, for example from 10 mm to 20 mm.

For example, the instructions 6000 comprise instructions 6420 to command one or more motors 3810, 3820, 3830, 3840, 3850, 3910, 3920, 3930, 2930 to configure one or more of the position and speed of a dispenser nozzle 2940 at one or more spatial positional coordinates $(X_F, Y_F, Z_F)$ and one or more spatial orientation coordinates $(\varphi_F, \theta_F, \psi_F)$.

For example, the instructions 6000 comprise instructions 6430 to command a dispenser nozzle extension actuator 2930 to adjust one or more of the extension position 2980 and speed of the dispenser nozzle as a function of one or more of the position 205 and speed of the pressure foot device 1100. For example, the instructions 6000, for example the instructions 6430, comprise instructions to adjust the speed of one or more entrainment motor, for example a dispenser nozzle entrainment motor 2950, for example to entrain thermoplastic material. For example, the speed is adjusted as a function of one or more of: the speed of the tow entrainment motor; the curvature of a path's curved portion; and the distance 206 between the nozzle 2940 and the object surface 200.

While the foregoing is directed to embodiments of the present disclosure, other and further embodiments of the invention may be devised without departing from the basic scope thereof. Therefore, the scope of the present disclosure is determined by the claims that follow.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (that is, meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (for example, "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments become, for example, apparent upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. A pressure foot device for applying an elongate fiber tow onto an object surface, the device comprising:
   a foot surface including a straight foot segment configured to press the fiber tow onto the object surface, the straight foot segment including a rear end and a front end that define a frontal direction from the rear end to the front end;
   a groove including a left lip and a right lip configured to guide the fiber tow to the foot surface, the groove defining a groove midplane as a planar portion along a mid-line of the groove and extending between the left lip and the right lip of the groove, the groove joining onto the front end of the straight foot segment and oriented at an elevation angle with respect to the straight foot segment,
   the groove including a flared end that joins the groove to the front end of the straight foot segment on the foot surface.

2. The device of claim 1, wherein the foot surface includes:
   a first toe surface at a first side of the groove midplane and oriented at a first elevation angle and a first azimuthal angle offset from the frontal direction; and
   a second toe surface at a second side of the groove midplane and oriented at a second elevation angle and a second azimuthal angle offset from the frontal direction;
   wherein the first azimuthal angle and the second azimuthal angle are included in a range from 30° to 90° with respect to the frontal direction.

3. The device of claim 1, wherein the flared end includes a chamfer with an elevation angle in a range from 30° to 70° with respect to the frontal direction.

4. The device of claim 1, wherein the device includes a hollow foot shaft to translate the fiber tow to the groove, an axis of which is located on the groove midplane.

5. The device of claim 1, wherein the device includes a foot pinion, the axis of which is located on the groove midplane.

6. The device of claim 1, wherein the foot surface includes, with respect to the front end, a first material within a first sector that is proximal to the front end and a second material within a second sector that is distal from the front end, wherein a thermal conductivity of the second material is at most half of a thermal conductivity of the first material.

7. The device of claim 1, wherein the foot surface includes a heat sink.

8. The pressure foot device of claim 1, the groove midplane extending between the left lip and the right lip of the groove until even with the left lip and the right lip in the frontal direction.

9. A system for applying an elongate fiber tow onto an object surface, the system comprising:
   a pressure foot device including:
      a foot surface configured to press the fiber tow onto the object surface, the foot surface including a straight foot segment for pressing the fiber tow onto the object surface, the straight foot segment including a rear end and a front end that define a frontal direction from rear end to front end; and
      a groove including a left lip and a right lip configured for guiding the fiber tow to the foot surface, the groove defining a groove midplane as a planar portion along a mid-line of the groove between the left lip and the right lip of the groove, the groove joining onto the front end of the straight foot segment and being oriented at an elevation angle with respect to the straight foot segment, the groove including a flared end that joins with the foot surface, wherein the pressure foot device includes a hollow foot shaft to translate the fiber tow to the groove, an axis of the hollow foot shaft located on the groove midplane; and
   a foot shaft housing, characterized by the axis of rotation of the hollow foot shaft, defining a Z-axis, wherein the axis of rotation of the hollow foot shaft is orthogonal to the straight foot segment and is located in the groove midplane.

10. The system of claim 9, wherein the axis of rotation of the hollow foot shaft is collinear with an axis of rotation of the foot shaft housing and wherein a portion of the hollow foot shaft forms a sliding fit within the foot shaft housing.

11. The system of claim 9, wherein the foot shaft housing includes one or more sources of heat.

12. The system of claim 9, further including one or more pinch roller assemblies and wherein one or more of the pinch roller assemblies includes a first roller and a second roller, wherein a tangent that is common to the first roller and to the second roller is collinear with the axis of rotation of the foot shaft.

13. A method for applying an elongate fiber tow onto an object surface, the method comprising:
    translating an elongate fiber tow through a hollow foot shaft into a groove of a pressure foot device unto a foot surface of the pressure foot device, the groove including a left lip, a right lip, and defining a groove midplane along a mid-line of the groove and extending between the left lip and the right lip of the groove, wherein an axis of the hollow foot is located on the groove midplane;
    guiding the fiber tow within the groove to a flared end of the groove;
    curving the fiber tow around the flared end of the groove to a straight foot segment included in the foot surface of the pressure foot device;
    wherein the straight foot segment includes a rear end and a front end that define a frontal direction from the rear end to the front end, and
    the groove joining onto the front end of the straight foot segment and being oriented at an elevation angle with respect to the straight foot segment; and
    pressing the fiber tow between the straight foot segment and the object surface.

14. The method of claim 13, wherein one or more of the steps of translating, guiding, curving, and pressing includes heating the fiber tow.

15. The method of claim 13, wherein the step of pressing includes cooling the fiber tow.

16. The method of claim 13, further including rotating the pressure foot device around an axis of rotation that is orthogonal to the straight foot segment and located within the groove midplane.

17. The method of claim 13, further including one or more of translating and rotating the pressure foot device along a path from a path start to a path end;

wherein the straight foot segment is collinear with a tangent to the path of the pressure foot device and a point of tangency to the path is included within the groove midplane.

18. The method of claim 17, wherein the fiber tow is translated within the groove at a speed equal to the speed at which the point of tangency to the path translates along the path.

19. The method of claim 17, further including actuating a tow cutter assembly at a location along the path that is ahead of the path end by a path length equal to a length of fiber tow from a blade of the tow cutter assembly to the front end of the straight foot segment.

20. The method of claim 17, further including unwinding the fiber tow wherein the step of unwinding includes rotating the pressure foot device.

21. The method of claim 13, further comprising measuring a distance between the straight foot segment and the object surface.

* * * * *